(12) United States Patent
Matsumura

(10) Patent No.: US 10,457,276 B2
(45) Date of Patent: Oct. 29, 2019

(54) VEHICLE RUNNING CONTROL APPARATUS

(71) Applicant: TOYOTA JIDOSHA KABUSHIKI KAISHA, Toyota-shi (JP)

(72) Inventor: Takeshi Matsumura, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 173 days.

(21) Appl. No.: 15/486,883

(22) Filed: Apr. 13, 2017

(65) Prior Publication Data
US 2017/0297567 A1    Oct. 19, 2017

(30) Foreign Application Priority Data
Apr. 13, 2016    (JP) .................................. 2016-080456

(51) Int. Cl.
  *B60W 30/08*    (2012.01)
  *B60W 40/08*    (2012.01)
  *B60K 28/06*    (2006.01)

(52) U.S. Cl.
  CPC ............. *B60W 30/08* (2013.01); *B60K 28/06* (2013.01); *B60W 40/08* (2013.01);
  (Continued)

(58) Field of Classification Search
  None
  See application file for complete search history.

(56) References Cited

U.S. PATENT DOCUMENTS 9,495,874 B1 * 11/2016 Zhu ...................... G05D 1/0088
2013/0311043 A1    11/2013 Kobana et al.
(Continued)

FOREIGN PATENT DOCUMENTS

DE    102 20 782 A1    11/2003
EP    2 657 921 A1    10/2013
(Continued)

OTHER PUBLICATIONS

Office Action dated Aug. 2, 2018 in corresponding Korean Patent Application No. 10-2017-0045213 (with English Translation), 13 pages.

*Primary Examiner* — Mussa A Shaawat
*Assistant Examiner* — Abdhesh K Jha
(74) *Attorney, Agent, or Firm* — Oblon, McClelland, Maier & Neustadt, L.L.P.

(57) ABSTRACT

The vehicle running control apparatus (driving support ECU 10) determines whether or not the driver of the vehicle is in an abnormal state in which the driver has lost an ability to drive the vehicle, and stops the vehicle by reducing the vehicle speed to 0 after an abnormality determination time point when the driver is determined to be in the abnormal state. The vehicle running control apparatus predicts a position at which the vehicle stops when the vehicle speed is reduced at a predetermined deceleration, when the predicted stop position is not within a stop prohibited area (for example, a curved road and a section within a predetermined distance from a point at which the road changes from the curved road to the straight road), it decelerates the vehicle with the deceleration and stops the vehicle. In contrast, the vehicle running control apparatus makes the vehicle ran with a constant speed when the predicted stop position is within the stop prohibited area.

9 Claims, 20 Drawing Sheets

(52) U.S. Cl.
CPC . *B60W 2040/0818* (2013.01); *B60W 2420/42* (2013.01); *B60W 2420/52* (2013.01); *B60W 2540/18* (2013.01); *B60W 2540/26* (2013.01); *B60W 2550/146* (2013.01); *B60W 2550/402* (2013.01); *B60W 2720/106* (2013.01)

(56) References Cited

U.S. PATENT DOCUMENTS

| | | | | |
|---|---|---|---|---|
| 2015/0345961 | A1* | 12/2015 | Oooka | B60W 30/143 |
| | | | | 701/25 |
| 2015/0345964 | A1* | 12/2015 | Oooka | B60W 30/12 |
| | | | | 701/41 |
| 2015/0375757 | A1* | 12/2015 | Schiek | B60W 50/14 |
| | | | | 701/23 |
| 2016/0071418 | A1* | 3/2016 | Oshida | G08G 1/22 |
| | | | | 701/23 |
| 2016/0107644 | A1* | 4/2016 | Eigel | B60W 50/14 |
| | | | | 701/70 |
| 2017/0174210 | A1* | 6/2017 | Choi | B60W 10/18 |

FOREIGN PATENT DOCUMENTS

| | | | |
|---|---|---|---|
| EP | 2657921 A1 * | 10/2013 | ............ G08G 1/167 |
| JP | 6-156112 A | 6/1994 | |
| JP | 2007-241471 A | 9/2007 | |
| JP | 2009-73462 | 4/2009 | |
| JP | 2010-6279 | 1/2010 | |
| JP | 5569602 B2 | 7/2014 | |
| JP | 2015-228089 A | 12/2015 | |

* cited by examiner

VEHICLE RUNNING CONTROL APPARATUS

BACKGROUND OF THE INVENTION

1. Field of the Invention

The present invention relates to a vehicle running control apparatus which reduces a vehicle speed to stop the vehicle when a driver falls into an abnormal state in which the driver loses an ability to drive the vehicle.

2. Description of the Related Art

Conventionally, an apparatus has been proposed, which determines whether or not a driver falls into an abnormal state where the driver loses an ability to drive a vehicle (for example, a drowsy driving state, a mental and physical failure state, or the like), and reduces/decreases a vehicle speed when the driver is determined to be in such an abnormal state (for example, refer to Japanese Patent Application Laid-Open (kokai) No. 2009-73462).

It should be noted that, in the following, an "abnormal state in which the driver loses an ability to drive a vehicle" may also be simply referred to as an "abnormal state of losing driving ability", and a "determination of whether or not the driver is in the abnormal state of losing driving ability" may also be referred to as an "abnormality determination of a driver".

SUMMARY OF THE INVENTION

However, according to the conventional apparatus, when it is determined that the driver has fallen into the abnormal state of losing driving ability, the vehicle may be stopped in an area (for example, a curved road) with a poor visibility due to the shape of road. As a result, when a driver of a following vehicle finds/recognizes the stopped vehicle, it may be necessary for the driver of the following vehicle to apply a sudden brake to the following vehicle in order to avoid a collision with a rear end of the stopped vehicle.

The present invention has been made in order to solve the above-mentioned problem. That is, one of objects of the present invention is to provide a vehicle running control apparatus which reduces/decreases a vehicle speed to stop the vehicle, and which does not stop the vehicle in the area with the poor visibility due to the shape of the road, when it is determined that the driver has fallen into the abnormal state of losing driving ability.

The vehicle running control apparatus (hereinafter, may be referred to as a "the present invention apparatus") of the present invention is applied to a vehicle. The vehicle running control apparatus of the present invention comprises;

abnormality determination means for determining whether or not a driver of the vehicle is in an abnormal state where the driver loses an ability to drive the vehicle (10, each step in FIG. 3); and running stopping means for decreasing a vehicle speed of the vehicle to zero to stop the vehicle after an abnormality determination time point which is a time point at which it is determined that the driver is in the abnormal state (10, steps 515, 550, and 555 in FIG. 5), The abnormality determination of the driver may be performed through various methods as will be described later. For example, the abnormality determination can be performed by determining whether or not a state in which the driver does not perform an operation for driving the vehicle (no driving operation state) has continued for a threshold time (driver abnormality determination threshold time) or more. The abnormality determination can also be performed by determining whether or not a state in which the driver does not push a confirmation button has continued for a threshold time or more, even when the driver is urged to press the confirmation button, or the like. Alternatively, this abnormality determination can be performed using so-called "driver monitoring technology" disclosed in Japanese Patent Application Laid-open No. 2013-152700, etc.

Further, the running stopping means is configured to control the vehicle speed of the vehicle so as not to stop the vehicle within a stop prohibited area, wherein a curved road is defined as the stop prohibited area (step 535 and step 540 in FIG. 5).

Therefore, it is possible to avoid a situation in which a vehicle (hereinafter, referred to as a "deceleration target vehicle") which is to be stopped owing to the determination that the driver is in the abnormal state in which the driver has lost the ability to drive the vehicle is stopped on/within a curved road (curve road) where visibility is not good. As a result, when the driver of a following vehicle finds/recognizes the deceleration target vehicle, a possibility that it is necessary for the driver of the following vehicle to apply a sudden brake to the following vehicle can be decreased.

In one of aspects of the present invention apparatus, the running stopping means is configured to also (additionally) define, as the stop prohibited area, a section between a first point at which a road changes from a curved road to a straight road and a second point to which the straight road extends for a first predetermined distance from the first point (steps 735, 740, and 745; steps 835, 840, and 850; steps 1130, 1135, and 1155; each step in FIG. 14; each step in FIG. 17).

Even if the road changes from the curved road to the straight road at a change point, the driver of the following vehicle is delayed in finding/recognizing the deceleration target vehicle when the deceleration target vehicle is stopped immediately after the change point. Therefore, the driver of the following vehicle needs to apply the sudden brake to the following vehicle. In contrast, the deceleration target vehicle is not stopped in a straight road within the first predetermined distance from the change point (first point) at which the road changes from the curved road to the straight road, according to the aspect described above. Thus, it is possible to reduce the possibility that the driver of the following vehicle needs to apply the sudden brake to the following vehicle when the driver finds/recognizes the deceleration target vehicle which has been stopped.

Further, the running stopping means is configured to define, as the stop prohibited area, a section between a "pass point at which a gradient of a road changes from an ascending gradient to a descending gradient" and a "point that is a second predetermined distance away from the pass point" (step 1210).

It is difficult for a driver of a vehicle to visually recognize (see) far (opposite) side of the pass point. That is, the visibility is not good in the pass point. Therefore, if the deceleration target vehicle has been stopped within a short distance from (after passing over) the pass point, the driver of the following vehicle needs to apply the sudden brake to the following vehicle when the driver of the following vehicle finds/recognizes that deceleration target vehicle. In contrast, according to the above aspect, since the section between the pass point and the point which is the second predetermined distance away from the pass point is also defined as the stop prohibited area, the deceleration target vehicle is not stopped in this section. As a result, it is possible to reduce the possibility that the driver of the following vehicle needs to apply the sudden brake to the following vehicle when the driver finds/recognizes the deceleration target vehicle which has been stopped.

In one of the aspects of the present invention apparatus,
the running stopping means is configured to:
decrease the vehicle speed of the vehicle toward a first vehicle speed after the abnormality determination time point (steps 510 and 515; steps 710 and 715);
perform a stop position prediction process for predicting a stop position of the vehicle in a case where the vehicle is decelerated with/at a constant deceleration from a state in which the vehicle speed is the first vehicle speed (steps 525 and 530; steps 725 and 730);
perform the stop position prediction process again after maintaining the vehicle speed of the vehicle at the first vehicle speed for a predetermined time, if the predicted stop position is within the stop prohibited area (steps 535 and 540; steps 735 and 740); and
decrease the vehicle speed of the vehicle with the constant deceleration to stop the vehicle, if the predicted stop position is not within the stop prohibited area (steps 535, 550, and 555; steps 735, 750, and 755).

According to this aspect, the deceleration vehicle is immediately decelerated to the first vehicle speed which is relatively low so as to further enhance safety, and thereafter, the deceleration target vehicle can be stopped so as not to require the following vehicle to apply the sudden brake to the following vehicle.

In one of the aspects of the present invention apparatus,
the abnormality determination means is configured to:
determine that the driver of the vehicle is in a tentative abnormal state when a first driving state (e.g., no driving operation state) which occurs when there is a possibility that the driver of the vehicle has lost the ability to drive the vehicle continues for a first threshold time (Tkeikoku) or more (steps 950, and 965); and
determine that the driver of the vehicle is in the abnormal state when a second driving state (e.g., no driving operation state) which occurs when there is a possibility that the driver of the vehicle has lost the ability to drive the vehicle continues for a second threshold time (Tijoth-Tkeikoku) or more from a time point at which it is determined that the driver is in the tentative abnormal state (steps 970, and 980), and
the running stopping means is configured to:
decrease the vehicle speed of the vehicle toward a first vehicle speed (SPD1$th$) with a first deceleration (Dec1) from a time point at which it is determined that the driver of the vehicle is in the tentative abnormal state (step 1020, step 1105, step 1110, and step 1115);
maintain the vehicle speed of the vehicle at the first vehicle speed when the vehicle speed of the vehicle reaches the first vehicle speed (SPD1$th$) before a time point at which it is determined that the driver is in the abnormal state (step 1118 and step 1155);
perform a stop position prediction process for predicting a stop position of the vehicle in a case where the vehicle is decelerated with a constant second deceleration (Dec2) from a state in which the vehicle speed is the first vehicle speed (SPD1$th$) after a time point at which it is determined that the driver is in the abnormal state (step 1040, step 1110, step 1118, step 1120, step 1125);
perform the stop position prediction process again after maintaining the vehicle speed of the vehicle at the first vehicle speed for a predetermined time, if the predicted stop position is within the stop prohibited area (step 1130 and step 1155); and
decrease the vehicle speed of the vehicle with the constant second deceleration to stop the vehicle, if the predicted stop position is not within the stop prohibited area (steps 1130, 1135, and 1140).

According to this aspect, when the abnormality determination that the driver has fallen into the abnormal state of losing driving ability has not been finalized/confirmed at the time point at which the vehicle speed reaches the first vehicle speed (SPD1$th$) after it was determined that the driver was in the tentative abnormal state (that is, when a value of a driver abnormality occurrence flag Xijo has not been set to "1"), the own vehicle is enforced to run/travel with/at a constant speed until that abnormality determination is finalized/confirmed. Accordingly, it is possible to secure a time period for making the determination that the driver has fallen into the abnormal state of losing driving ability, and to stop the own vehicle after the determination is finalized/confirmed.

In one of the aspects of the present invention apparatus,
the running stopping means is configured to set the first predetermined distance to a distance which becomes longer as a radius (R) of curvature of the curved road connected to the first point becomes smaller (step 735, step 835, each step in FIG. 14).

The visibility becomes poorer as the radius of curvature becomes smaller. Therefore, the above aspect can stop the deceleration target vehicle at a more appropriate position.

In one of the aspects of the present invention apparatus,
the running stopping means is configured to control the vehicle speed of the vehicle in such a manner that the vehicle speed of the vehicle does not become lower than a lower limit vehicle speed which becomes higher as a radius of curvature of a curved road on which the vehicle runs becomes smaller, after the abnormality determination time point (each step in FIG. 14). It should be noted that, in this case, it is preferable that the running stopping means be configured to, after the abnormality determination time point, control the vehicle speed of the vehicle in such a manner that the vehicle speed of the vehicle does not become lower than the lower limit vehicle speed which becomes higher as the radius of curvature of the curved road on which the vehicle runs becomes smaller, and be configured to decelerate the vehicle with/at a constant deceleration when the vehicle speed of the vehicle does not become and/or is not predicted to become lower than the lower limit vehicle speed.

According to this aspect, the deceleration target vehicle passes the curved road at a vehicle speed higher than or equal to the lower limit vehicle speed. Thus, the deceleration target vehicle does not stop immediately after it enters a straight road from the curved road, and stops after it runs/travels for a predetermined distance (first predetermined distance) from a time point at which it enters the straight road. As a result, the driver of the following vehicle can decelerate or stop the following vehicle without applying the sudden brake to the following vehicle, when the driver of the following vehicle finds/recognizes the deceleration target vehicle which has been stopped.

In the embodiments of the present invention, the deceleration target vehicle is decelerated while maintaining a constant deceleration. This deceleration with the constant deceleration is different from a deceleration during an automatic vehicle speed control by an ordinary ACC (described later), and the like. Therefore, it is possible to impart an uncomfortable feeling to the occupant including the driver of the deceleration target vehicle. Accordingly, each of the embodiments can have the driver recognize that the vehicle is enforced to be decelerated if the driver has not fallen into the abnormal state of losing driving ability, and can have the passenger other than the driver recognize that the vehicle is enforced to be decelerated. In addition, since the deceleration does not fluctuate, it is possible to reduce a possibility that a driver of the other vehicle running in the vicinity of the deceleration target vehicle needs to perform a special driving operation such as the sudden brake and a sudden steering.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE PREFERRED EMBODIMENT

A vehicle running control apparatus (driving support apparatus) according to each of embodiments of the present invention will be described below, referring to figures.

First Embodiment

Figure 1:
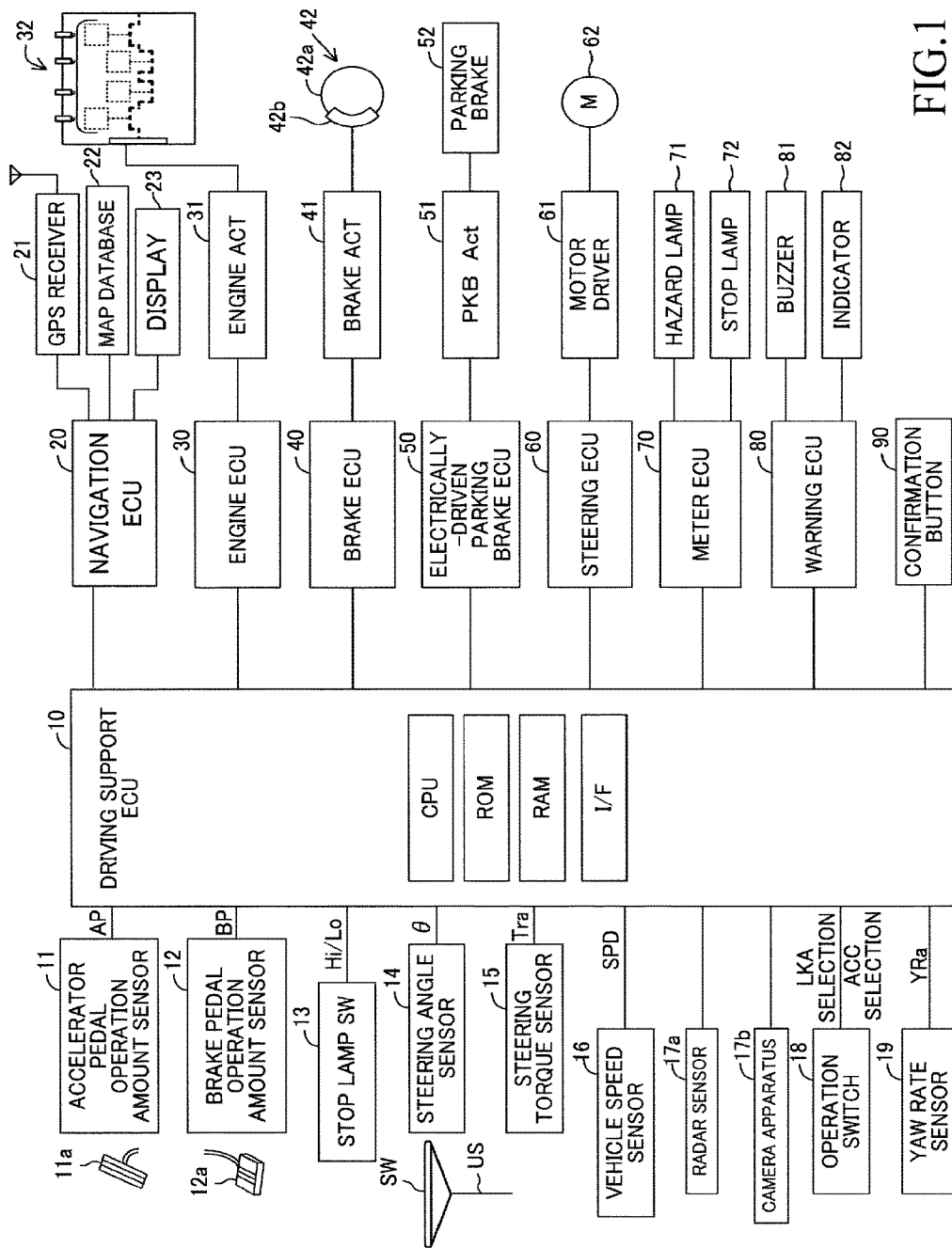
FIG. 1 is a schematic diagram of a vehicle running control apparatus (a first apparatus) according to a first embodiment of the present invention.

A vehicle running control apparatus according to the first embodiment of the present invention (hereinafter, referred to as a "first apparatus") is, as shown in FIG. 1, applied to a vehicle (hereinafter, referred to as an "own (or self) vehicle" in order to be distinguished from other vehicles), and comprises a driving support ECU 10, a navigation ECU 20, an engine ECU 30, a brake ECU 40, an electrically-driven parking brake ECU 50, a steering ECU 60, a meter ECU 70, and a warning ECU 80.

Each of these ECUs is an electronic control unit comprising a microcomputer as a main part. The ECUs are connected with each other via CAN (Controller Area Network) which is not illustrated so that they are capable of mutually transmitting and receiving information. In the present specification, the microcomputer includes a CPU, a ROM, a RAM, a non-volatile memory, an interface I/F, and the like. The CPU is configured to implement various functions by executing instructions (programs, routines) stored in the ROM. Some or all of these ECUs may be integrated into a single ECU.

The driving support ECU 10 is connected to sensors (includes switches) described below, and is configured to receive a detection signal or an output signal of each of the sensors. It should be noted that each of the sensors may be connected to one of the ECUs other than the driving support ECU 10. In this case, the driving support ECU 10 receives the detection signal or the output signal of the sensor via CAN from the ECU to which the sensor is connected.

An accelerator pedal operation amount sensor 11 is configured to detect an operation amount of an accelerator pedal 11a (an accelerator position) of the own vehicle, and to output a signal representing an accelerator pedal operation amount AP.

A brake pedal operation amount sensor 12 is configured to detect an operation amount of a brake pedal 12a of the own vehicle, and to output a signal representing a brake pedal operation amount BP.

A stop lamp switch 13 is configured to output a low level signal when the brake pedal 12a is not being depressed (is not being operated), and to output a high level signal when the brake pedal 12a is being depressed (is being operated).

A steering angle sensor 14 is configured to detect a steering angle of the own vehicle, and to output a signal representing a steering angle $\theta$.

A steering torque sensor 15 is configured to detect a steering torque applied to a steering shaft US of the own vehicle by an operation of a steering handle SW, and to output a signal representing a steering torque Tra.

A vehicle speed sensor 16 is configured to detect a running speed (a vehicle speed) of the own vehicle, and to output a signal representing a vehicle speed SPD.

The radar sensor 17a is configured to obtain information on a road in front of the own vehicle and three-dimensional objects existing in the road. The three-dimensional objects represent moving objects such as pedestrians, bicycles and automobiles, and stationary objects such as utility poles, trees and guardrails. Hereinafter, these three-dimensional objects may be referred to as a "target object" in some cases.

The radar sensor 17a includes "a radar transmitting/receiving part and a signal processing part" which are not shown in the figure.

The radar transmitting/receiving part emits an electric wave in a millimeter waveband (hereinafter, referred to as a "millimeter wave") to an ambient region of the own vehicle including a front region of the own vehicle, and receives the millimeter wave (that is, a reflected wave) reflected from the target object existing within the emitted area.

The signal processing part obtains, every time a predetermined period of time elapses, an inter-vehicle gap (a longitudinal distance) Dfx(n), a relative speed Vfx(n), a lateral distance Dfy(n), a relative lateral speed Vfy(n), and the like, with respect to each detected target object (n) based on a phase difference between the transmitted millimeter wave and the received reflected wave, an attenuation level of the reflected wave, a time from a point in time of transmitting the millimeter wave to a point in time of receiving the reflected wave, and the like.

The inter-vehicle gap Dfx(n) is a distance between the own car and the target object (n) (for example, a preceding vehicle) along a central axis of the own vehicle.

The relative speed Vfx(n) is a difference between a speed Vs of the target object (n) (for example, the preceding vehicle) and a speed Vj of the own vehicle VA (=Vs−Vj). The speed Vs of the target object (n) is a speed of the target object (n) in a traveling direction of the own vehicle.

The lateral distance Dfy(n) is a distance between "a central position of the target object (n) (for example, a central position of the preceding vehicle in its width direction)" and the central axis of the own vehicle in a direction perpendicular to the same central axis. The lateral distance Dfy(n) is also referred to as a "lateral position".

The relative lateral speed Vfy(n) is a speed of the central position of the target object (n) (for example, the central position of the preceding vehicle in its width direction) in the direction perpendicular to the central axis of the own vehicle.

The camera apparatus 17b includes "a stereo camera and an image processing part" which are not shown in the figure.

The stereo camera obtains a left-and-right pair of image data by photographing the landscape of a left side region and a right region in front of the vehicle.

The image processing part is configured to calculate whether or not there is a target object, a relative relationship between the own vehicle and the target object, or the like, based on the photographed left-and-right pair of image data to output them.

The driving support ECU 10 is configured to determine a relative relationship (the target object information) between the own vehicle and the target object, by synthesizing "the relative relationship between the own vehicle and the target object obtained by the radar sensor 17a" and "the relative relationship between the own vehicle and the target object obtained by the camera apparatus 17b." Further, the driving support ECU 10 is configured to recognize a lane marker such as a left white line and a right white line of a road (hereinafter, simply referred to as a "white line") based on the left-and-right pair of image data which are taken by the camera apparatus 17b, and to obtain a shape of the road (radius of curvature indicating a degree of road bending) and a positional relationship between the road and the vehicle, or the like. In addition, the driving support ECU 10 is configured to be able to obtain information as to whether or not there is a roadside wall based on the image data which is taken by the camera apparatus 17b.

An operation switch 18 is a switch operated by the driver. The driver can select whether or not to perform a traffic lane keeping control (LKA: Lane Keeping Assist control) by operating the operation switch 18. Moreover, the driver can select whether or not to perform a trailing inter-vehicle gap (distance) control (ACC: Adaptive Cruise Control) by operating the operation switch 18.

A yaw rate sensor 19 is configured to detect a yaw rate of the own vehicle to output an actual yaw rate YRa.

The driving support ECU 10 is configured to perform the LKA and the ACC. Further, the driving support ECU 10 is configured to determine whether or not the driver is in an abnormal state (abnormal state of losing driving ability) in which the driver loses the ability to drive the vehicle, and to perform various controls for performing appropriate processes when it is determined that the driver is in the abnormal state of losing driving ability.

The navigation ECU 20 is connected to a GPS receiver 21 that receives GPS signals for detecting a position of the own vehicle, a map database 22 that is storing map information etc, a touch panel display 23 that is a human machine interface, and the like. The navigation ECU 20 identifies the present position (present position) Pnow of the own vehicle based on the GPS signals, performs various arithmetic processing based on the position Pnow of the own vehicle and the map information stored in the map database 22, and performs a route guidance using the display 23.

The map information stored in the map database 22 includes road information. The road information includes parameters indicating the shape of the road for each section of the road (for example, the radius of curvature of the road or the curvature of the road, which indicate the degree of how the road curves). The curvature is the reciprocal of the radius of curvature.

The engine ECU 30 is connected to an engine actuator 31. The engine actuator 31 includes actuators for changing a driving state of an internal combustion engine 32. In the present embodiment, the internal combustion engine 32 is a gasoline fuel injection, spark ignition, multi-cylinder engine, and comprises a throttle valve to adjust an intake air amount. The engine actuator 31 includes at least a throttle valve actuator to change an opening degree of the throttle valve. The engine ECU 30 can change torque which the internal combustion engine 32 generates by driving the engine actuator 31. The torque which the internal combustion engine 32 generates is transmitted to a non-illustrated driving wheels via a non-illustrated transmission gear. Therefore, the engine ECU 30 can control the engine actuator 31 to control a driving force of the own vehicle, so as to change an acceleration state (an acceleration).

The brake ECU 40 is connected to a brake actuator 41. The brake actuator 41 is provided at a hydraulic circuit between a non-illustrated master cylinder to compress operating fluid with a depression force of the brake pedal and friction brake mechanisms 42 provided at left-and-right-front wheels and left-and-right-rear wheels. The friction brake mechanisms 42 comprises a brake disc 42a fixed to the wheel and a brake caliper 42b fixed to a vehicle body. The brake actuator 41 adjusts, in response to an instruction from the brake ECU 40, an hydraulic pressure that is supplied to a wheel cylinder which is built in the brake caliper 42, and operates the wheel cylinder with the hydraulic pressure. Thereby, the brake actuator 41 presses a brake pad onto the brake disc 42a to generate a friction brake force. Accordingly, the brake ECU 40 can control the brake force of the own vehicle by controlling the brake actuator 41.

The electrically-driven parking brake ECU (hereinafter, may be referred to as an "EPB ECU") 50 is connected to a parking brake actuator (hereinafter, may be referred to as a "PKB actuator") 51. The parking brake actuator 51 is an actuator for pressing the brake pad onto the brake disc 42a or for, in a case when comprising a drum brake, pressing a shoe on a drum rotating with the wheel. Therefore, EPB ECU 50 can apply a parking brake force to the wheels by means of the PKB actuator 51 to maintain the vehicle in a stop state.

The steering ECU 60 is a control apparatus of a well-known electrically-driven power steering system and is connected to a motor driver 61. The motor driver 61 is connected to a turning use motor (steering motor) 62. The turning use motor 62 is incorporated into a non-illustrated "steering mechanism including the steering wheel, the steering shaft coupled to the steering wheel, a gear mechanism for steering, and the like" of the vehicle. The steering motor 62 generates torque with electric power supplied from the motor driver 61 to be able to add a steering assist torque using the torque, or to turn left-and-right steered wheels.

The meter ECU 70 is connected to a non-illustrated digital indication type meter and is also connected to a hazard lamp 61 and a stop lamp 72. The meter ECU 70 can, in response to an instruction from the driving support ECU 10, make the hazard lamp 61 flash/blink and make the stop lamp 72 light.

The warning ECU 80 is connected to a buzzer 81 and an indicator 82. The warning ECU 80 can, in response to an instruction from the driving support ECU 10, make the buzzer 81 sound to alert the driver, make a mark for alerting (for example, a warning lamp) light on the indicator 82, and display an operating state of a driving support control on the indicator 82.

Moreover, the driving support ECU 10 is connected to a confirmation button 90. The confirmation button 90 is arranged at a position capable of being operated by the driver. The confirmation button 90 is configured to output a low-level signal when not being operated and to output a high-level signal when being pressed.

(Outline of Operation)

Next, the main operation of the driving support ECU 10 (hereinafter, also simply referred to as an "ECU 10") according to the first apparatus will be described. The ECU 10 determines whether or not a driver is in an "abnormal state in which the drive loses driving ability to drive a vehicle (abnormal state of losing driving ability)", using one of various methods described later. For example, when the vehicle speed SPD of the own vehicle is equal to or higher than the predetermined vehicle speed (an abnormality determination permission vehicle speed) SPDth, the ECU 10 determines (monitors) whether or not a no driving operation state (state in which no operation for driving occurs) continues for more than or equal to an abnormality determination threshold time. The no driving operation state is a state in which none of "the accelerator pedal operation amount AP, the brake pedal operation amount BP, and the steering torque Tra" changes. When the no driving operation state continues for the abnormality determination threshold time or more, the ECU 10 determines that the driver is in the abnormal state of losing driving ability (it confirms/finalize the determination that the driver is in the abnormal state of losing driving ability).

The ECU 10 performs a traffic lane keeping control (LKA: Lane Keeping Assist control) when it determines that the driver is in the "abnormal state of losing driving ability." The traffic lane keeping control is a control to support a steering operation of the driver by applying a steering torque to the steering mechanism so that a position of the own vehicle is kept in the vicinity of a target traveling line in a "lane on which the own vehicle is traveling (a traveling lane)." The traffic lane keeping control itself is well-known (for example, refer to Japanese Patent Applications Laid-Open (kokai) No. 2008-195402, No. 2009-190464, No. 2010-6279, and Japanese Patent No. 4349210, etc.). Therefore, a brief description on the LKA control will be made below.

More specifically, the ECU 10 recognizes (obtains) "the left white line LL and the right white line LR" of the lane on which the own vehicle is traveling based on the image data transmitted from the camera device 17b, and determines a central position of a pair of these white lines to be (as) a target traveling line Ld. Moreover, the ECU 10 calculates a curve radius (a radius of curvature) R of the target traveling line Ld, and a position and a direction of the own vehicle in the traveling line defined by the left white line LL and the right white line LR.

The ECU 10 calculates a distance Dc (hereinafter, referred to as a "center distance Dc") in a width direction of a road between a central position of a front end of the own vehicle and the target traveling line Ld, and calculates a deviation angle θy (hereinafter, referred to as a "yaw angle θy") between a direction of the target traveling line Ld and the traveling direction of the own vehicle.

Further, the ECU 10 calculates a target yaw rate YRc* from the following formula (1) based on the center distance Dc, the yaw angle θy and a road curvature ν (=1/R) at a predetermined calculation interval. In the formula (1), K1, K2 and K3 are control gains. The target yaw rate YRc* is a yaw rate which is set in such a manner that the own vehicle can travel along the target traveling line Ld.

$$YRc^* = K1 \times Dc + K2 \times \theta y + K3 \times \nu \qquad (1)$$

The ECU 10 calculates a target steering torque Tr* for obtaining the target yaw rate YRc* based on the target yaw rate YRc* and the actual yaw rate YRa at a predetermined calculation interval. More specifically, the ECU 10 stores a lookup table in advance which defines a relationship between a "deviation between the target yaw rate YRc* and the actual yaw rate YRa" and a "target steering torque Tr*", and calculates the target steering torque Tr* by applying the deviation between the target yaw rate YRc* and the actual yaw rate YRa to this table. Thereafter, the driving support ECU 10 controls the turning use motor 62 using the steering ECU 60 in such a manner that the actual steering torque Tra becomes equal to the target steering torque Tr*. The above description is an outline of the traffic lane keeping control.

In addition, when the ECU 10 determines that the driver is in the "abnormal state of losing driving ability", the ECU 10 stops the own vehicle by reducing/decreasing the vehicle speed of the own vehicle to zero. In that case, the ECU 10 controls the vehicle speed of the own vehicle so that the own vehicle stops on the straight road without stopping on the curved road.

Figure 2:
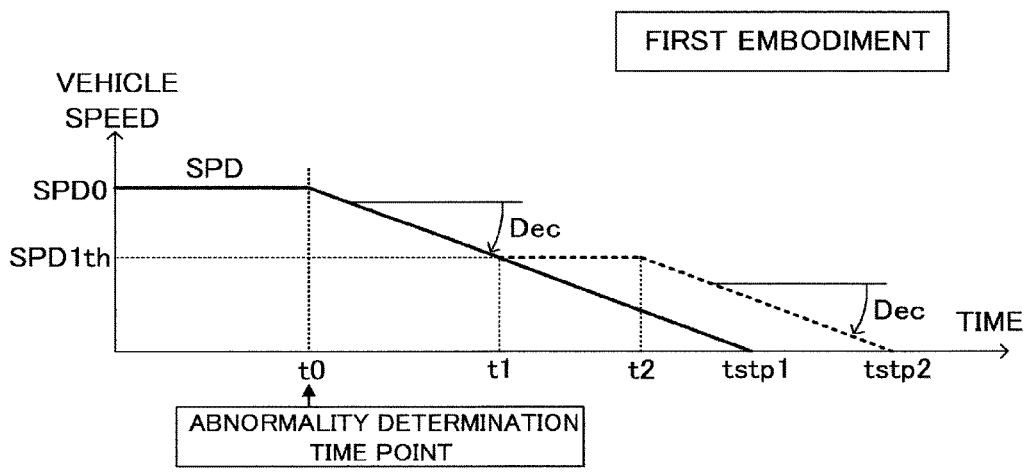
FIG. 2 is a timing chart for illustrating an operation of the first apparatus.

More specifically, as shown in FIG. 2, the ECU 10 decelerates the own vehicle with/at a constant deceleration Dec, until a time point at which the vehicle speed SPD of the own vehicle is decreased to become equal to a first speed SPD1*th* from a time point (abnormality determination time point) t0 at which it determined that the driver is in the "abnormal state of losing driving ability." It should be noted that the first vehicle speed SPD1*th* is a vehicle speed lower than the above-described predetermined vehicle speed (the abnormality determination permission vehicle speed) SPDth.

When the vehicle speed SPD of the own vehicle is reduced to be the first speed SPD1*th*, the ECU 10 calculates/obtains a stop position of the own vehicle (a position of the own vehicle at a time point tstp1 in FIG. 2) when it further decelerates the own vehicle with/at the constant deceleration Dec to determine whether or not the stop position is within a curved road (curve). Thereafter, the ECU 10 continues to decelerate the own vehicle with/at the constant deceleration Dec to stop the own vehicle, when the stop position of the own vehicle is not within the curved road (curve) (in other words, when the stop position is the straight road).

In contrast, when the stop position is within the curved road (curve), the ECU 10 makes the own vehicle run with/at a constant speed in such a manner that the vehicle speed (that is, SPD1*th*) of the own vehicle is maintained. In addition, the ECU 10 calculates/obtains a stop position of the own vehicle, when the ECU 10 decelerates the own vehicle with/at the constant deceleration Dec from the time point at which a certain time ts elapses. When the stop position is within the curved road, the ECU 10 further makes the own vehicle run with/at the constant speed for the certain time ts. When the stop position is not within the curved road, the ECU 10 decelerates the own vehicle with/at the constant deceleration Dec to stop the own vehicle. In the example shown in FIG. 2, the stop position of the own vehicle when the ECU 10 decelerates the own vehicle with/at the constant deceleration Dec from the time point t2 is not within the curved road but within the straight road. Therefore, the first apparatus decelerates the vehicle with/at the constant deceleration Dec from the time point t2 to stop the own vehicle. In this manner, according to the first apparatus, the own vehicle stops in a straight road providing a good visibility, and the first apparatus does not stop the own vehicle in a curved providing a poor visibility (bad view). As a result, a driver of a following vehicle can decelerate or stop the following vehicle without applying a sudden brake to the following vehicle, when the driver of the following vehicle recognizes/finds the stopped own vehicle.

(Concrete Operation)

Next, the specific operation of the CPU in the ECU 10 according to the first apparatus will be described. The CPU is configured to perform each of routines shown by flowcharts in FIG. 3 to FIG. 5 every time a predetermined period of time elapses.

<<Abnormality Determination of a Driver>>

Figure 3:
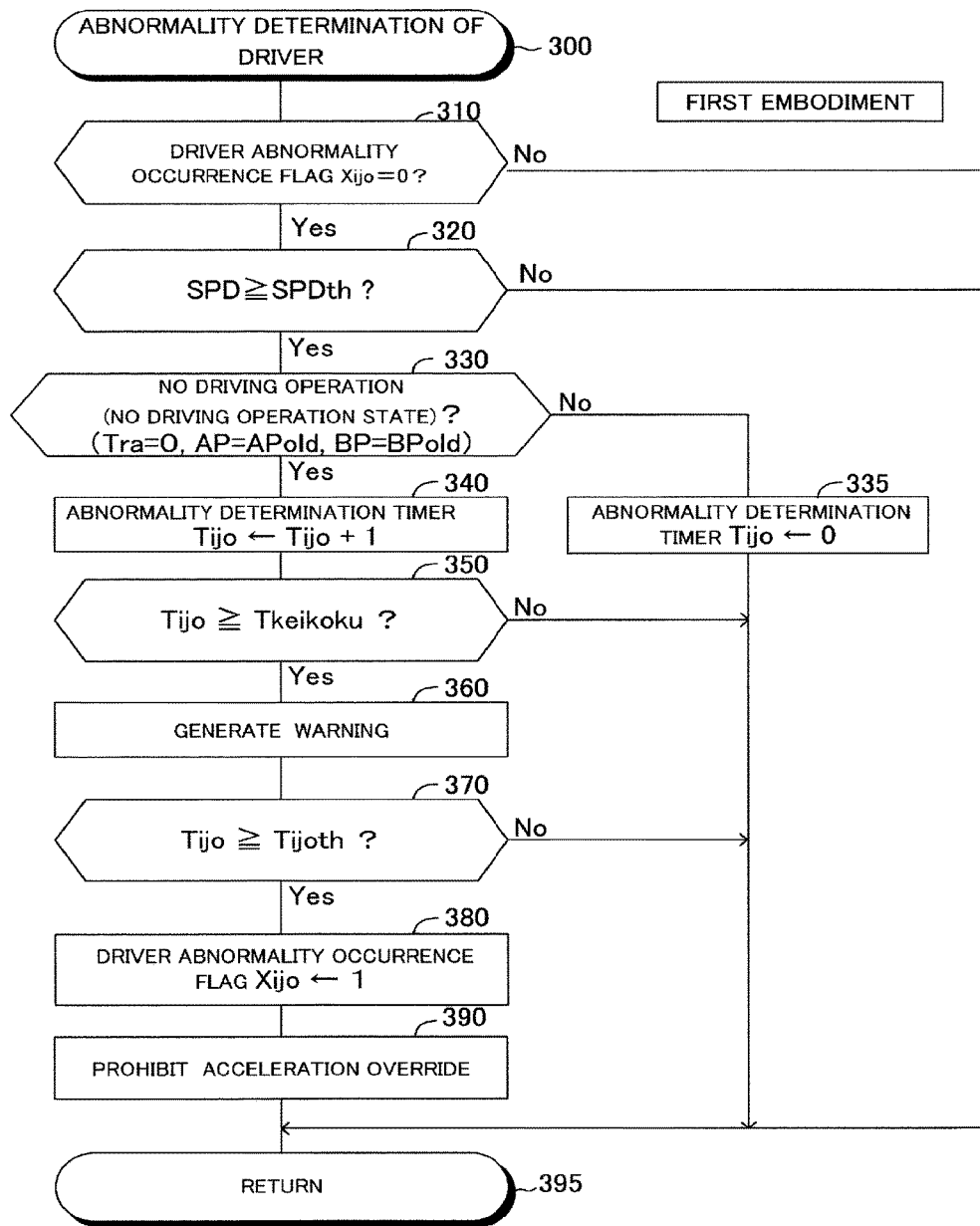
FIG. 3 is a flowchart for illustrating a routine performed by the CPU of the first apparatus.

When a predetermined timing arrives, the CPU starts processing with step 300 in FIG. 3, and proceeds to step 310 to determine whether or not a value of a driver abnormality occurrence flag Xijo is "0". The value of the flag Xijo is set to "0" in a non-illustrated initialization routine performed by the CPU, when a non-illustrated ignition key switch is changed from an off position to an on position. The value of the flag xijo is set to "1", when it is determined that the driver is in the "abnormal state of losing driving ability" (refer to step 380 which will be described later). When the value of the flag Xijo is not "0" (that is, the value is "1"), the CPU makes a "No" determination at step 310, and directly proceeds to step 395 to tentatively terminate the present routine.

In contrast, when the value of the flag Xijo is "0", the CPU makes a "Yes" determination at step 310 to proceed to step 320, at which the CPU determines whether or not the vehicle speed SPD is higher than or equal to a predetermined vehicle speed (the abnormality determination permission vehicle speed, a forced deceleration permission vehicle speed) SPDth. When the vehicle speed SPD is neither higher than nor equal to the predetermined vehicle speed SPDth, the CPU makes a "No" determination at step 320, and directly proceeds to step 395 to tentatively terminate the present routine. It should be noted that the predetermined vehicle speed SPDth is set at a value higher than a maximum value of a lower limit vehicle speed in the other embodiments which will be described later.

In contrast, when the vehicle speed is higher than or equal to the predetermined vehicle speed SPDth, the CPU makes a "Yes" determination at step 320, and proceeds to step 330 to determine whether or not a state at the present time is the no driving operation state (non-driving-operation state). The no driving operation state is a state where none of parameters consisting of a combination of more than or equal to one of "the accelerator pedal operation amount AP, the brake pedal operation amount BP and the steering torque Tra" changes. In the preset example, the CPU regards, as the no driving operation state, a state in which none of "the accelerator pedal operation amount AP, the brake pedal operation amount BP, and the steering torque Tra" does not change and the steering torque Tra remains "0".

When the state at the present time is not the no driving operation state, the CPU makes a "No" determination at step 330, and proceeds to step 335 to set the value of the abnormality determination timer Tijo to "0." Thereafter, the CPU proceeds to step 395 to tentatively terminate the present routine.

In contrast, when the state at the present time is the no driving operation state, the CPU makes a "Yes" determination at step 330, and proceeds to step 340 to increase a value of an abnormality determination timer Tijo by "1." Therefore, the value of the abnormality determination timer Tijo represents a duration time of the no driving operation state.

Next, the CPU proceeds to step 350 to determine whether or not the value of the abnormality determination timer Tijo is larger than or equal to a warning start threshold time Tkeikoku. When the value of the abnormality determination timer Tijo is smaller than the warning start threshold time Tkeikoku, the CPU makes a "No" determination at step 350, and directly proceeds to step 395 to tentatively terminate the present routine.

In contrast, when the value of the abnormality determination timer Tijo is larger than or equal to the warning start threshold time Tkeikoku, the CPU makes a "Yes" determination at step 350, and proceeds to step 360 to make the buzzer 81 generate a warning sound, and make the "warning lamp" flash on the indicator 82. In addition, the CPU displays a warning message which urges the driver of the own vehicle to operate any of "the accelerator pedal 11*a*, the brake pedal 12*a*, and the steering handle SW" on the indicator 82.

Subsequently, the CPU proceeds to step 370 to determine whether or not the value of the abnormality determination timer Tijo is larger than or equal to a driver abnormality determination threshold time Tijoth. The driver abnormality determination threshold time Tijoth is set at a time longer than the warning start threshold time Tkeikoku. When the value of the abnormality determination timer Tijo is smaller than the driver abnormality determination threshold time Tijoth, the CPU makes a "No" determination at step 370, and directly proceeds to step 395 to tentatively terminate the present routine.

In contrast, when the value of the abnormality determination timer Tijo is larger than or equal to the driver abnormality determination threshold time Tijoth, the CPU makes a "Yes" determination at step 370 and proceeds to step 380 to set the value of the driver abnormality occurrence flag Xijo to "1." Thereafter, the CPU proceeds to step 390 to prohibit the vehicle from accelerating (including decelerating) based on a change in the accelerator pedal operation amount AP even when the accelerator pedal operation amount AP changes. That is, the CPU prohibits an acceleration override. Then, the CPU proceeds to step 395 to tentatively terminate the present routine. In this manner, when the no driving operation state continues for more than or equal to the warning start threshold time Tkeikoku, the warning to urge the driver to perform the driving operation is made. When the no driving operation state continues for more than or equal to the driver abnormality determination threshold time Tijoth, the determination that the driver is in the abnormal state of losing driving ability is confirmed/finalized, and the value of the flag Xijo is set to "1." It should be noted that the CPU automatically performs the traffic lane keeping (LKA) control described above, when the value of the flag Xijo is "1." This feature is also adopted in the other embodiments.

<<Deceleration Flag Setting>>

Figure 4:
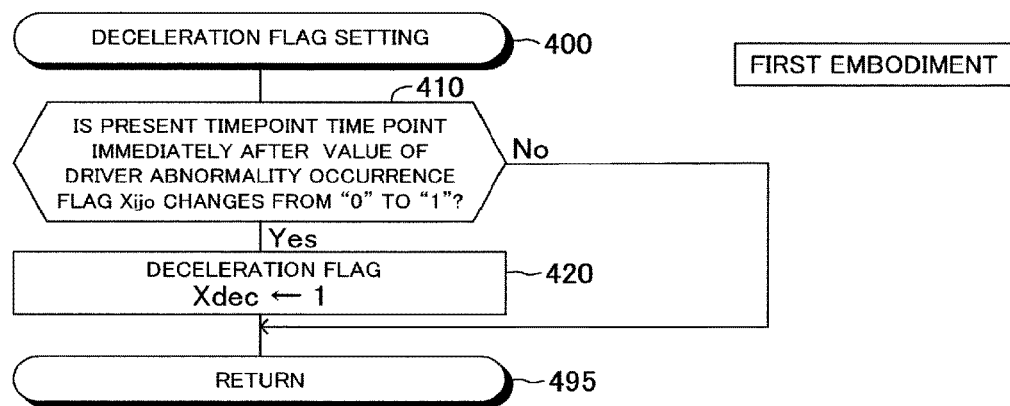
FIG. 4 is a flowchart for illustrating a routine performed by the CPU of the first apparatus.

When a predetermined timing arrives, the CPU starts processing with step 400 in FIG. 4, and proceeds to step 410 to determine whether or not the present time point is a time point immediately after the value of the driver abnormality occurrence flag Xijo is changed from "0" to "1."

When the present time point is the time point immediately after the value of the flag Xijo is changed from "0" to "1", the CPU makes a "Yes" determination at step 410, and proceeds to step 420 to set a value of a deceleration flag Xdec to "1." The value of the deceleration flag Xdec is set to "0" in the initialization routine described above. Thereafter, the CPU proceeds to step 495 to tentatively terminate the present routine.

In contrast, when the present time point is not the time point immediately after the value of the flag Xijo is changed from "0" to "1", the CPU makes a "No" determination at step 410, and directly proceeds to step 495 to tentatively terminate the present routine.

<<Process for Stop (Vehicle Deceleration)>>

Figure 5:
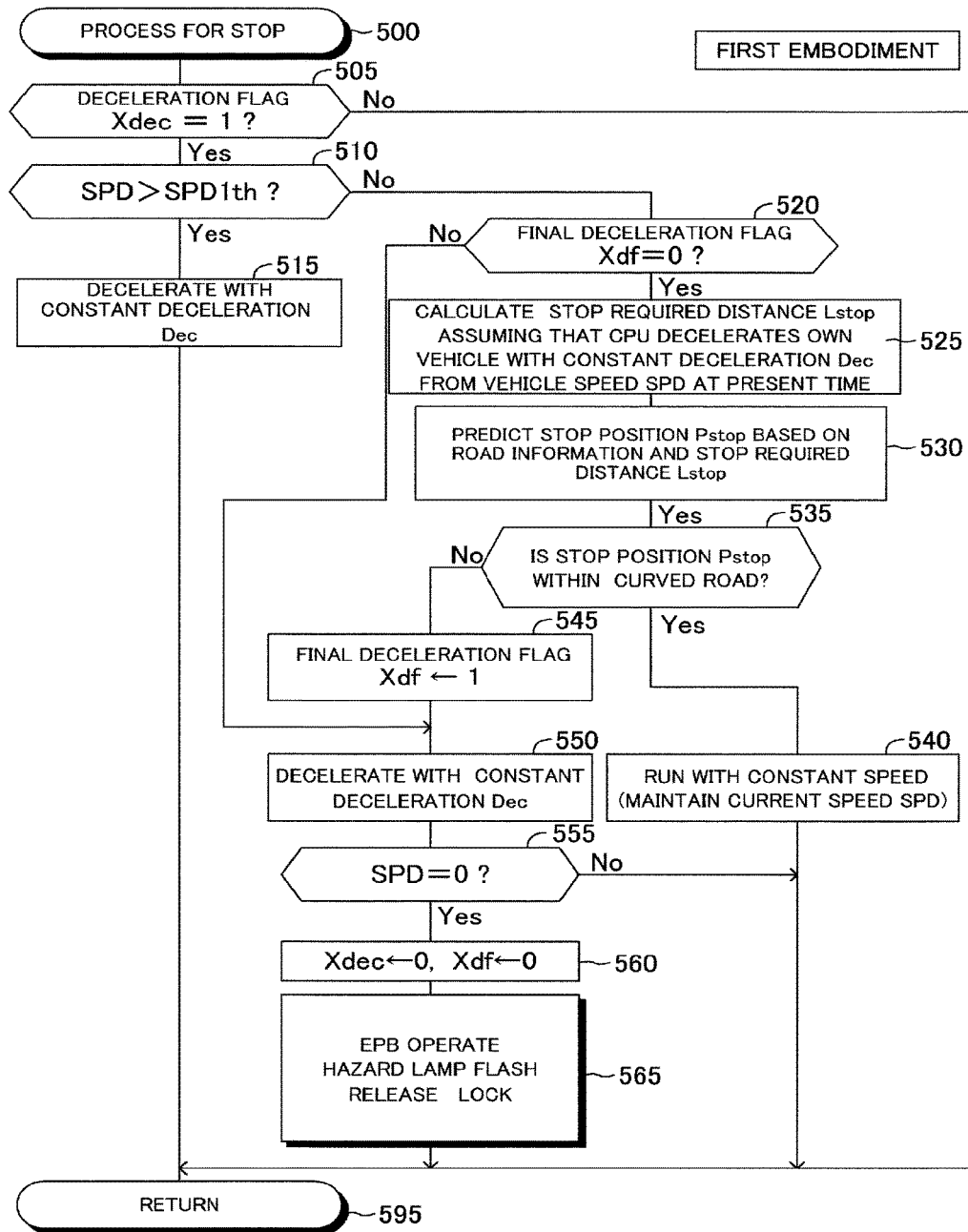
FIG. 5 is a flowchart for illustrating the routine performed by the CPU of the first apparatus.

When a predetermined timing arrives, the CPU starts processing with step 500 in FIG. 5, and proceeds to step 505 to determine whether or not the value of the deceleration flag Xdec is "1." When the value of the deceleration flag Xdec is not "1", the CPU makes a "No" determination at step 505, and directly proceeds to step 595 to tentatively terminate the present routine.

In contrast, when the value of the deceleration flag Xdec is "1", the CPU makes a "Yes" determination at step 505, and proceeds to step 510 to determine whether or not the vehicle speed SPD is higher than the first vehicle speed SPD1$th$. Assuming that the present time point is a time point immediately after the value of the flag Xijo has been changed from "0" to "1" and the value of the deceleration flag Xdec has been set to "1", the vehicle speed SPD is higher than the first vehicle speed SPD1$th$. In this case, the CPU makes a "Yes" determination at step 510, and proceeds to step 515 to decelerate the own vehicle with/at the constant deceleration Dec, and thereafter, the CPU proceeds to step 595 to tentatively terminate the present routine. It should be noted that the CPU calculates the acceleration of the own vehicle from an amount of change in the vehicle speed SPD per unit time (the vehicle speed is obtained on the basis of the signal from vehicle speed sensor 16), and transmits a command signal to have the acceleration of the own vehicle equal to the deceleration Dec to the Engine ECU 30 and the brake ECU 40. This feature is also adopted in the other embodiments.

When the vehicle speed SPD of the own vehicle becomes equal to the first vehicle speed SPD1$th$ owing to repetition of such a processing, the CPU makes a "No" determination at step 510, and proceeds to step 520 to determine whether or not a value of a final deceleration flag Xdf is "0." The value of the final deceleration flag Xdf is set to "0" in the above-described initialization routine, and is set to "1" at step 545 which will be described later.

Therefore, the value of the final deceleration flag Xdf is "0" at the time point when the vehicle speed SPD becomes equal to the first vehicle speed SPD1$th$ owing to the deceleration of the own vehicle, and thus, the CPU makes a "Yes" determination at step 520, and performs processes of step 525 and step 530 in sequence which will be described below.

Step 525: the CPU calculates a travel distance (that is, a stop required distance) Lstop($=SPD^2/(2\cdot|Dec|)$) of the own vehicle from the present position to a position at which the own vehicle stops, assuming that the CPU decelerates the own vehicle with/at the constant deceleration Dec from the vehicle speed SPD (=SPD1$th$) at the present time.

Step 530: the CPU obtains the position (the present position) Pnow of the own vehicle at the present time point from the navigation ECU 20, and predicts a stop position Pstop of the own vehicle at which the own vehicle will stop based on the road information acquired from the map database 22 through the navigation ECU 20 and the stop required distance Lstop.

Subsequently, the CPU proceeds to step 535 to determine whether or not the stop position Pstop is a position within a curved road which is a stop prohibited area, based on the road information which is acquired from the map database 22 through the navigation ECU 20. More specifically, the CPU determines whether or not a "radius of curvature R of a road section including the stop position Pstop" obtained from the map database 22 is smaller than or equal to a threshold curvature radius Rth. In the present specification, it should be noted that the curved road is defined as a road having a curvature radius R which is smaller than or equal to the threshold curvature radius Rth, and the straight road is defined as a road having a curvature radius R larger than the threshold curvature radius Rth (that is, a road which can be regarded as a substantially straight line).

When the stop position Pstop is the position within the curved road, the CPU makes a "Yes" determination at step 535, and proceeds to step 540 to maintain the vehicle speed by making the own vehicle run with/at the constant speed. Thereafter, the CPU proceeds to step 595 to tentatively terminate the present routine. Therefore, in this case, the own vehicle is kept traveling with/at the constant speed for the predetermined period of time, and when the predetermined period of time elapses, the processes of steps 525 to 535 are repeated again.

In contrast, when the CPU performs the process of step 535, if the stop position Pstop is not within the curved road (in other words, if the stop position Pstop is a position within the straight road), the CPU makes a "No" determination at step 535 to perform processes of step 545 and step 550 in sequence which will be described below, and proceeds to step 555.

Step 545: the CPU sets the value of the final deceleration flag Xdf to "1."

Step 550: the CPU decelerates the own vehicle with/at the constant deceleration Dec.

At step 555, the CPU determines whether or not the vehicle speed SPD is "0" (that is, whether or not the own vehicle has stopped). At this time point, since the vehicle speed SPD is not "0", the CPU makes a "No" determination at step 555, and directly proceeds to step 595 to tentatively terminate the present routine.

Thereafter, when the CPU again executes the present routine, the CPU makes a "Yes" determination at step 505, makes a "No" determination at step 510. Since the value of the final deceleration flag Xdf has been set at "1", the CPU makes a "No" determination at step 520 to proceed to step 550. Therefore, the own vehicle continues to be decelerated with/at the constant deceleration Dec. Then, the CPU makes a "No" determination at step 555 to tentatively terminate the present routine.

The above described processes are repeated, and as a result, the vehicle speed SPD becomes "0." In this case, when the CPU executes the present routine, the CPU makes a "Yes" determination at step 555, performs processes of step 560 and step 565 in sequence which will be described below, and proceeds to step 595 to tentatively terminate the present routine.

Step 560: the CPU sets the value of the deceleration flag Xdec to "0", and sets the value of the final deceleration flag Xdf to "0."

Step 565: the CPU applies the parking brake force to the wheels using the EPB-ECU 50. That is, the driving support ECU 10 maintains the own vehicle in the stopping state. Further, the CPU makes the hazard lamp 71 flash using the meter ECU 70, and releases a lock of doors of the own vehicle using a non-illustrated door lock ECU.

As described above, the first apparatus decelerates the own vehicle with/at the constant deceleration Dec after the time point at which it is determined that the driver is in the abnormal state of losing driving ability. Subsequently, at the time point at which the vehicle speed SPD of the own vehicle decreased down to the first predetermined vehicle speed SPD1$th$, the first apparatus performs the process for predicting the stop position of the own vehicle (performs the stop position prediction processing) under the assumption that the first apparatus continue to decelerate the own vehicle with/at the constant deceleration Dec thereafter. When the first apparatus predicts that the stop position of the own vehicle is the "position within the curved road defined as the stop prohibited area", the first apparatus makes the own vehicle run/travel at the constant speed for the predetermined time. When the first apparatus predicts that the stop position of the own vehicle is not the "position within the curved road defined as the stop prohibited area", the first apparatus decelerates the vehicle with/at the constant deceleration Dec to stop the own vehicle. Further, when the first apparatus makes the own vehicle run/travel with/at the constant speed only for the predetermined time, it again performs the stop position prediction processing at the time point at which that predetermined time elapses, and again determines whether or not a newly predicted stop position of the own vehicle is the "position within the curved road defined as the stop prohibited area."

As a result, the own vehicle is not made stop in the curved road on which visibility is poor, and thus it is possible to reduce the possibility that the sudden brake by the driver of the following vehicle is required when that driver finds/recognizes the stopped own vehicle.

Second Embodiment

Figure 6:
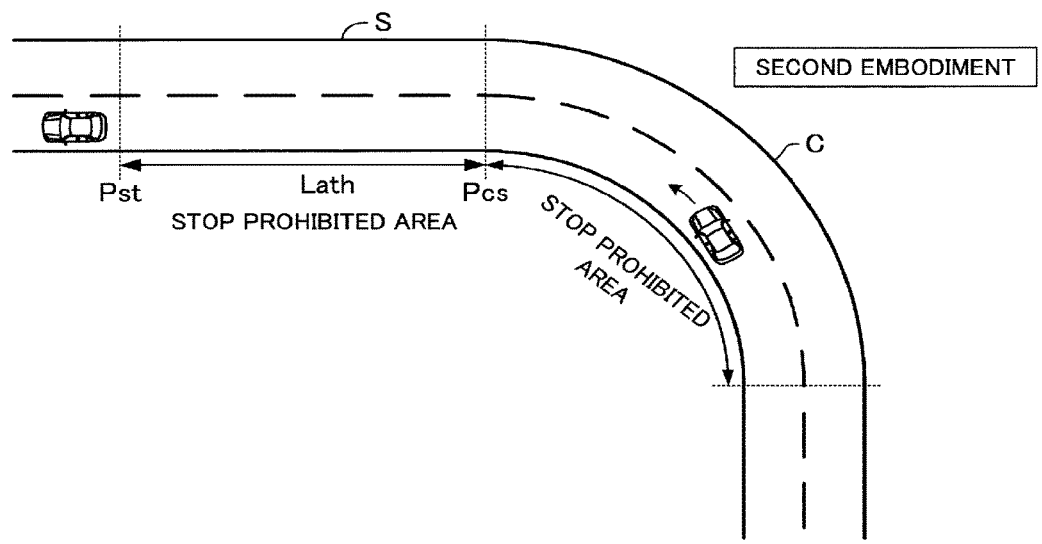
FIG. 6 is a figure for describing an operation of a vehicle running control apparatus (a second apparatus) according to a second embodiment of the present invention.

Next, a vehicle running control apparatus according to the second embodiment of the present invention (hereinafter, may be referred to as a "second apparatus") will be described. The second apparatus differs from the first apparatus only in that the second apparatus controls the vehicle speed so as not to stop the own vehicle within a stop prohibited area which, as shown in FIG. 6, includes the "section C of the curved road" and a "section S between a first point Pcs and a second point Pst." The first point Pcs is a "change point" at which a road changes from a curved road C to a straight road S. The second point Pst is a straight road continuing point till which a straight road continues by a predetermined distance (first predetermined distance) Lath from the change point Pcs.

(Concrete Operation)

Next, the concrete operation of the CPU of the ECU 10 according to the second apparatus will be described. The CPU is configured to execute each of routines shown by flowcharts in FIGS. 3 and 4, and FIG. 7 in place of FIG. 5, every time a predetermined period of time elapses. Since the flowcharts shown in FIG. 3 and FIG. 4 have already been described, hereinafter, an operation (a vehicle deceleration start processing) based on the flowchart shown in FIG. 7 will be described.

Figure 7:
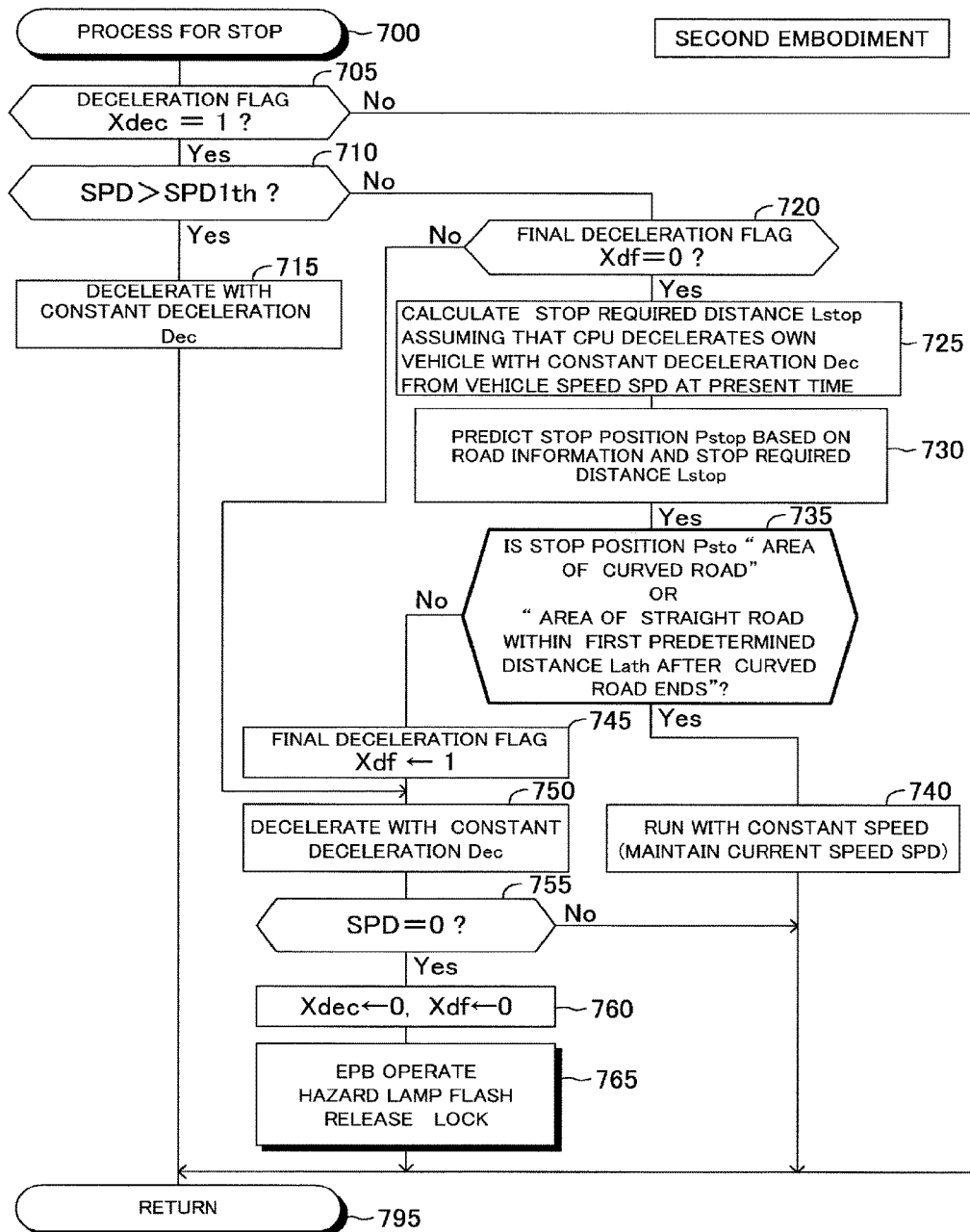
FIG. 7 is a flowchart for illustrating a routine performed by a CPU of the second apparatus.

Steps 705 to 765 of flowchart shown in FIG. 7 are steps at which the same processes are executed as steps 705 to 765 shown in FIG. 5, respectively, except for step 735. In other words, the flowchart of FIG. 7 is the flowchart of FIG. 5 in which step 535 of FIG. 5 is replaced with step 735. Therefore, the processing of step 735 will be described hereinafter.

When the CPU proceeds to step 735, the CPU determines whether or not the stop position is in either an "area of the curved road" or in an "area where the straight road does not continue for the first predetermined distance Lath or more after the curved road ends (that is, after transition from the curved road to the straight road)." That is, the "area of the curved road" and the "area where the straight road does not continue for the first predetermined distance Lath or more from the end point of the curved road" are the "stop prohibited area."

When the stop position Pstop is in the "stop prohibited area", the CPU makes a "Yes" determination at step 735, and proceeds to step 740 to maintain the vehicle speed by making the own vehicle run/travel with/at the constant speed. In contrast, when the stop position is not in the "stop prohibited area", the CPU makes a "No" determination at step 735 to proceeds to step 745 at which it sets the value of the final deceleration flag Xdf to "1", and proceeds to step 750 to decelerates the own vehicle with/at the constant deceleration Dec so as to stop the own vehicle.

As described above, when the second apparatus decelerates the own vehicle with/at the constant deceleration Dec after the time point at which it is determined that the driver is in the abnormal state of losing driving ability, and when the second apparatus predicts that the stop position of the own vehicle is in the "area defined as the stop prohibited area, including the curved road and a region within the first predetermined distance Lath from the location at which the road changes from the curved road to the straight road", the second apparatus makes the own vehicle run/travel with/at the constant speed. When the second apparatus predicts that the stop position of the own vehicle is not a position within the "stop prohibited area", the second apparatus decelerates the own vehicle with/at the constant deceleration Dec to stop the own vehicle.

The CPU sets the first predetermined distance Lath at a constant distance, however, it should be noted that the CPU may set the first predetermined distance Lath in such a manner that the distance Lath becomes longer as the "radius of curvature of the curved road just before connecting to the straight road" is smaller. In this case, the CPU may obtain the radius of curvature of the curved road from the map database 22 through the navigation ECU 20, and may calculate the predetermined distance Lath based on the obtained radius of curvature. Further, the CPU may directly read out (obtain) the stop prohibited area or the first predetermined distance Lath from the map database 22 through a navigation ECU 20.

As a result, since the own vehicle is not stopped in not only the curved road with poor visibility, but also in the "area/region within the first predetermined distance Lath from the point/location at which the road changes from the curved road to the straight road" where the timing of finding the stopped vehicle by the driver of the following vehicle is delayed, it is possible to reduce the possibility that the sudden brake is required for the following vehicle when the driver of the following vehicle has found/recognized the stopped own vehicle.

Third Embodiment

Next, a vehicle running control apparatus according to the third embodiment of the present invention (hereinafter, may be referred to as a "third apparatus") will be described. Meanwhile, in the second apparatus, when the value of the flag Xijo is "1", the deceleration when decelerating the own vehicle is the constant value Dec. In contrast, the third apparatus differs from the second apparatus only in the following points. The third apparatus decelerates the own vehicle while maintaining the constant first deceleration Dec1 until the vehicle speed SPD decreases to the first vehicle speed SPD1$th$ from the time point at which the value of the flag Xijo changes from "0" to "1", and the third apparatus decelerates the own vehicle with/at a constant second deceleration Dec 2 until the own vehicle is stopped from the time point at which the vehicle speed SPD decreases to the first vehicle speed SPD1$th$. A magnitude of the second deceleration Dec 2 is larger than a magnitude of the first deceleration Dec1, and therefore, the own vehicle is relatively slowly decelerated while the speed SPD is decreasing down to the first vehicle speed SPD1$th$, and the own vehicle is relatively rapidly decelerated while the vehicle speed SPD is decreasing from the first vehicle speed SPD1$th$ to "0."

(Concrete Operation)

Next, the concrete operation of the ECU 10 according to the third apparatus will be described. The CPU configured to execute each of routines shown by flowcharts in FIGS. 3 and 4, and FIG. 8 in place of FIG. 5 every time a predetermined period elapses. Since the flowcharts of FIG. 3 and FIG. 4 has been described, hereinafter, the operation (vehicle deceleration start processing) based on the flowchart of FIG. 8 will be described.

<<Stop (Vehicle Deceleration) Processing>>

Figure 8:
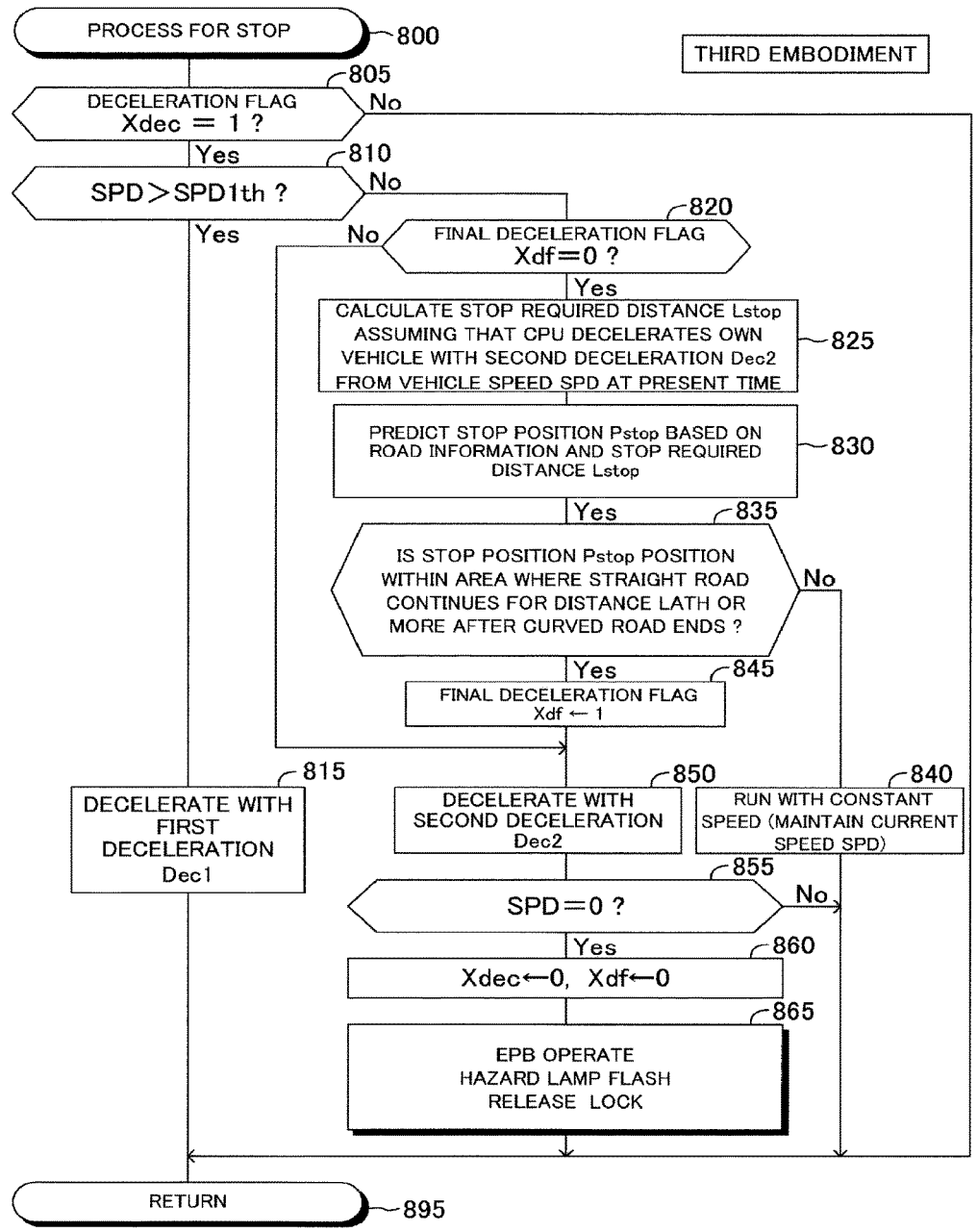
FIG. 8 is a flowchart for illustrating a routine performed by a CPU of a vehicle running control apparatus (a third apparatus) according to a third embodiment of the present invention.

When a predetermined timing arrives, the CPU starts processing with step 800 in FIG. 8, and proceeds to step 805 to determine whether or not the value of the deceleration flag Xdec is "1." When the value of the deceleration flag Xdec is not "1", the CPU makes a "No" determination at step 505, and directly proceeds to step 895 to tentatively terminate the present routine.

In contrast, the value of the deceleration flag Xdec is "1", the CPU makes a "Yes" determination at step 805, and proceeds to step 810 to determine whether or not the vehicle speed SPD is higher than the first vehicle speed SPD1$th$. Assuming that the present time point is a time point immediately after the value of the flag Xijo has been changed from "0" to "1" and the value of the deceleration flag Xdec has been set to "1", the vehicle speed SPD is higher than the first vehicle speed SPD1$th$. In this case, the CPU makes a "Yes" determination at step 810, and proceeds to step 815 to decelerate the own vehicle with/at the constant deceleration Dec1, and proceeds to step 895 to tentatively terminate the present routine. For example, the magnitude of the first deceleration Dec1 is 0.5 m/s$^2$.

When the vehicle speed SPD becomes equal to the first vehicle speed SPD1$th$ by the repetition of such a processing, the CPU makes a "No" determination at step 810, and proceeds to step 820 to determine whether or not the value of the final deceleration flag Xdf is "0." The value of the final deceleration flag Xdf is set to "0" in the initialization routine described above, and is set to "1" at step 845 described later.

Therefore, since the value of the final deceleration flag Xdf is "0" at the time point at which the vehicle speed becomes equal to the first vehicle speed SPD1$th$ owing to the deceleration of the own vehicle, the CPU makes a "Yes" determination at step 820 to perform processes of step 825 and step 830 in sequence which will be described below, and proceeds to step 835.

Step 825: the CPU calculates a travel distance (that is, a stop required distance) Lstop($=SPD^2/(2\cdot|Dec2|)$) of the own vehicle from the present position to a position at which the own vehicle stops, assuming that the CPU decelerates the own vehicle with/at the constant deceleration Dec2 from the vehicle speed SPD ($=SPD1th$) at the present time. The magnitude of the second deceleration Dec2 is larger than the magnitude of the first deceleration Dec1. For example, the magnitude of the second deceleration Dec2 is 1 m/s$^2$.

Step 830: the CPU obtains the position (the present position) Pnow of the own vehicle at the present time point from the navigation ECU 20, and predicts a stop position Pstop of the own vehicle at which the own vehicle will stop based on the road information acquired from the map database 22 through the navigation ECU 20 and the stop required distance Lstop.

Next, the CPU proceeds to step 835 to determine whether or not the stop position Pstop is a position within an "area where the straight road continues for the distance Lath or more after the curved road ends" based on the road information acquired from the map database 22 through the navigation ECU 20. That is, the CPU determines whether or not the stop position Pstop predicted at step 830 is a position outside the above-described stop prohibited area.

When the stop position Pstop is the position within the stop prohibited area, the CPU makes a "No" determination at step 835, and proceeds to step 840 to maintain the vehicle speed by making the own vehicle run/travel with/at the constant speed. Thereafter, the CPU proceeds to step 895 to tentatively terminate the present routine. Therefore, in this case, the processes of steps 825 to 835 are repeated after the predetermined period of time elapses.

In contrast, when the stop position Pstop is in the area outside the stop prohibited area (that is, a stop permission area) at the time point at which the process of step 835 is executed, the CPU makes a "Yes" determination at step 835, and performs processes of step 845 and step 850 in sequence which will be described below, and proceeds to step 855.

Step 845: the CPU sets the value of the final deceleration flag Xdf to "1."

Step 850: the CPU decelerates the own vehicle with/at the constant second deceleration Dec2.

The CPU determines whether or not the vehicle speed SPD is "0" (That is, whether or not the own vehicle has stopped) at step 855. At this time point, since the vehicle speed SPD is not "0", the CPU makes a "No" determination at step 855, and directly proceeds to step 895 to tentatively terminate the present routine.

Thereafter, when the CPU again executes the present routine, the CPU makes a "Yes" determination at step 805, makes a "No" determination at step 810, and makes a "No" determination at step 820 to proceed to step 850, since the value of the final deceleration flag Xdf has been set to "1." Therefore, the own vehicle is continued to be decelerated with/at the second deceleration Dec2. Then, the CPU makes a "No" determination at step 855 to tentatively terminate the present routine.

The repetition of those processes makes the vehicle speed SPD equal to "0." In this case, when the CPU executes the present routine, the CPU makes a "Yes" determination at step 855, performs processes of step 860 and step 865 in sequence which will be described below, and proceeds to step 895 to tentatively terminate the present routine.

Step 860: the CPU sets the value of the deceleration flag Xdec to "0", and sets the value of the final deceleration flag Xdf to "0."

Step 865: the CPU applies a parking brake force to the wheels using EPB·ECU 50. That is, the driving support ECU 10 maintains the own vehicle in a stop state. Moreover, the CPU makes the hazard lamp 71 flash using the meter ECU 70, and releases locks of doors of the own vehicle using a non-illustrated door lock ECU.

As described above, the third apparatus slowly decelerates the own vehicle with/at the constant first deceleration Dec1 from the time point at which it is determined that the driver is in the abnormal state of losing driving ability. Therefore, because it becomes unlikely that the own vehicle runs/travels at excessively low speed in the area with a poor visibility such as the curved road, the possibility that the following vehicle needs to apply the sudden brake to the following vehicle due to the own vehicle is decreased.

Moreover, at the time point at which the own vehicle speed SPD has decreased to the first predetermined vehicle speed SPD1*th*, the third apparatus predicts the stop position of the own vehicle under the assumption that it decelerates the own vehicle with/at the constant second deceleration Dec2. Thereafter, when the third apparatus predicts that the stop position of the own vehicle is in the "area defined as the stop prohibited area, including the curved road and the region within the first predetermined distance Lath from the location at which the road changes from the curved road to the straight road", the third apparatus makes the own vehicle run/travel with/at the constant speed. When the third apparatus predicts that the stop position of the own vehicle is not a position within the "stop prohibited area", the third apparatus rapidly decelerates the own vehicle with/at the constant second deceleration Dec2 to stop the own vehicle.

As a result, since the own vehicle is not stopped in not only the curved road with poor visibility, but also in the "area/region within the first predetermined distance Lath from the point/location at which the road changes from the curved road to the straight road" where the timing of finding the stopped vehicle by the driver of the following vehicle is delayed, it is possible to reduce the possibility that the sudden brake is required for the following vehicle when the driver of the following vehicle has found/recognized the stopped own vehicle.

Fourth Embodiment

Next, a vehicle running control apparatus according to the fourth embodiment of the present invention (hereinafter, may be referred to as a "fourth apparatus") will be described. When the above-described no driving operation state (in other words, a first driving state which occurs when there is a possibility that the driver of the own vehicle loses an ability to drive the own vehicle) continues for the warning start threshold time (first threshold time) Tkeikoku or more, the fourth apparatus determines that the driver is in a tentative abnormal state, and sets a value of a tentative abnormality occurrence flag Xk to "1." Further, when the above-described no driving operation state (in other words, a second driving state which occurs when there is a possibility that the driver of the own vehicle loses the ability to drive the own vehicle) continues for the driver abnormality determination threshold time Tijoth (time of the sum of the first threshold time and the second threshold time) or more, the fourth apparatus determines that the driver is in an abnormal state, and sets the value of the driver abnormality occurrence flag Xijo to "1." As described above, the driver abnormality determination threshold time Tijoth is longer than the warning start threshold time Tkeikoku.

When the value of the tentative abnormality occurrence flag Xk is changed from "0" to "1" (that is, when the tentative abnormality determination is made), the fourth apparatus decelerates the own vehicle while maintaining the constant first deceleration Dec1 until the vehicle speed decreases to the first vehicle speed SPD1*th*. In this case, the fourth apparatus does not prohibit an accelerator override.

Further, when the vehicle speed SPD has decreased to reach the first vehicle speed SPD1*th* and the value of the driver abnormality occurrence flag Xijo has been set to "1" (that is, when the determination of the driver abnormality has been finalized/confirmed), the fourth apparatus decelerates the own vehicle with/at the constant the second deceleration Dec2 until the own vehicle stops. However, even when the vehicle speed SPD has decreased to reach the first vehicle speed SPD1*th*, and if the value of the driver abnormality occurrence flag Xijo has not been set to "1", the fourth apparatus makes the own vehicle run/travel with the constant speed. In addition, when the value of the driver abnormality occurrence flag Xijo has been set to "1", the fourth apparatus prohibits the accelerator override.

(Concrete Operation)

Next, the concrete operation of the CPU of the ECU 10 according to the fourth apparatus will be described. The CPU configured to execute each of routines shown by flowcharts in FIG. 9 to FIG. 11 every time a predetermined period of time elapses.

<<Driver Abnormality Determination>>

Figure 9:
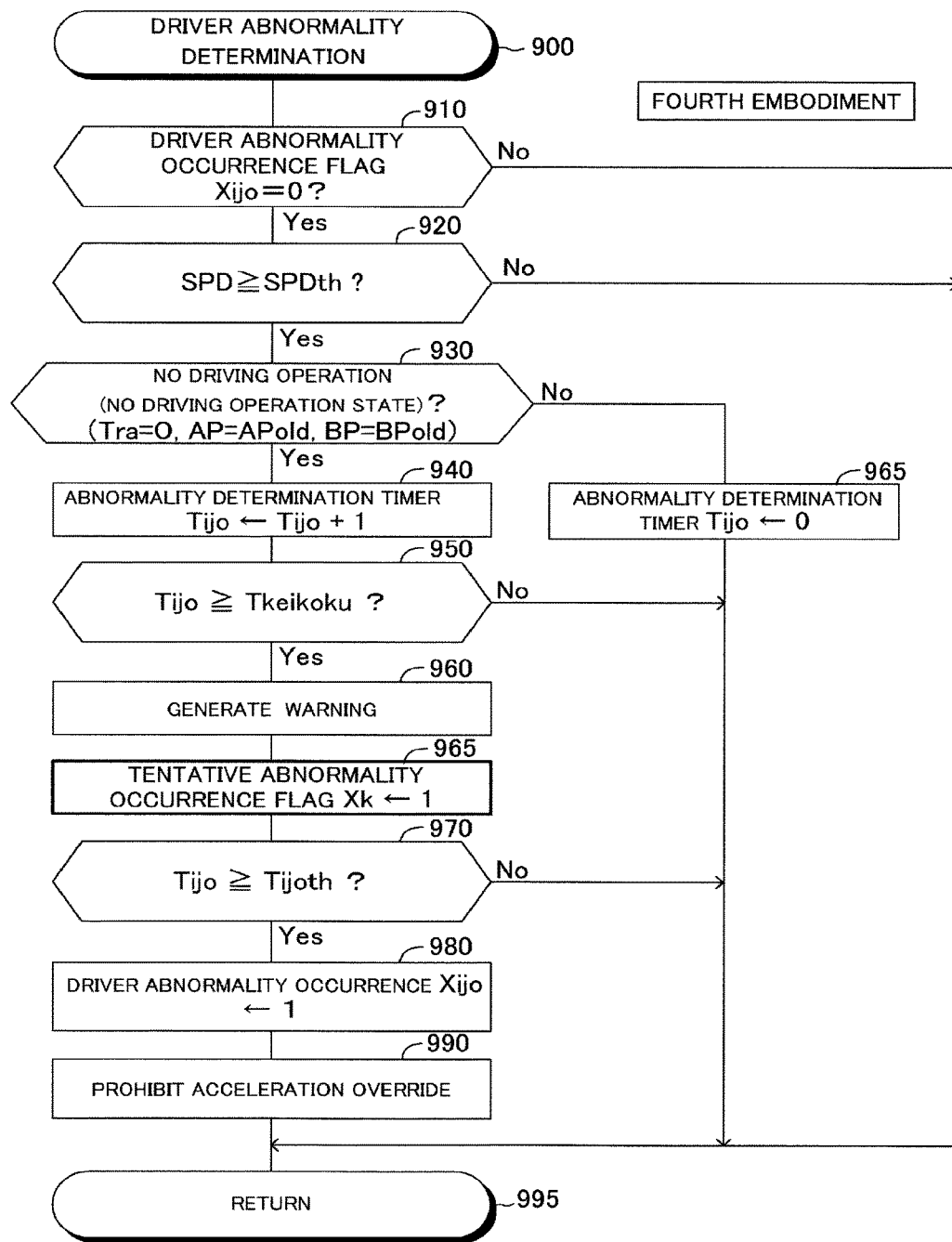
FIG. 9 is a flowchart for illustrating a routine performed by a CPU of a vehicle running control apparatus (a fourth apparatus) according to a fourth embodiment of the present invention.

Steps 910 to 990 of flowchart shown in FIG. 9 are steps at which the same processes are executed as steps 310 to 390 of the flowchart shown in FIG. 3, respectively, except for step 965. In other words, the flowchart of FIG. 9 is the same as the flowchart of FIG. 3 to which step 965 is added between step 360 and step 370. Therefore, hereinafter, only this difference will be described.

When the CPU generates the warning/alarm at step 960, it proceeds to step 965 to set the value of the tentative abnormality occurrence flag Xk to "1." The value of the tentative abnormality occurrence flag Xk is set to "0" in the initialization routine described above. Therefore, the value of the tentative abnormality occurrence flag Xk is set to "1", when the no driving operation state continues for the warning start threshold time Tkeikoku or more while the vehicle speed SPD is higher than or equal to the predetermined vehicle speed SPDth. In addition, as is the case with the first apparatus to the third apparatus, the value of the driver abnormality occurrence flag Xijo is set to "1" (refer to step 980), when the no driving operation state continues for the driver abnormality determination threshold time Tijoth or more while the vehicle speed SPD is higher than or equal to the predetermined vehicle speed SPDth.

<<Deceleration Flag Setting>>

Figure 10:
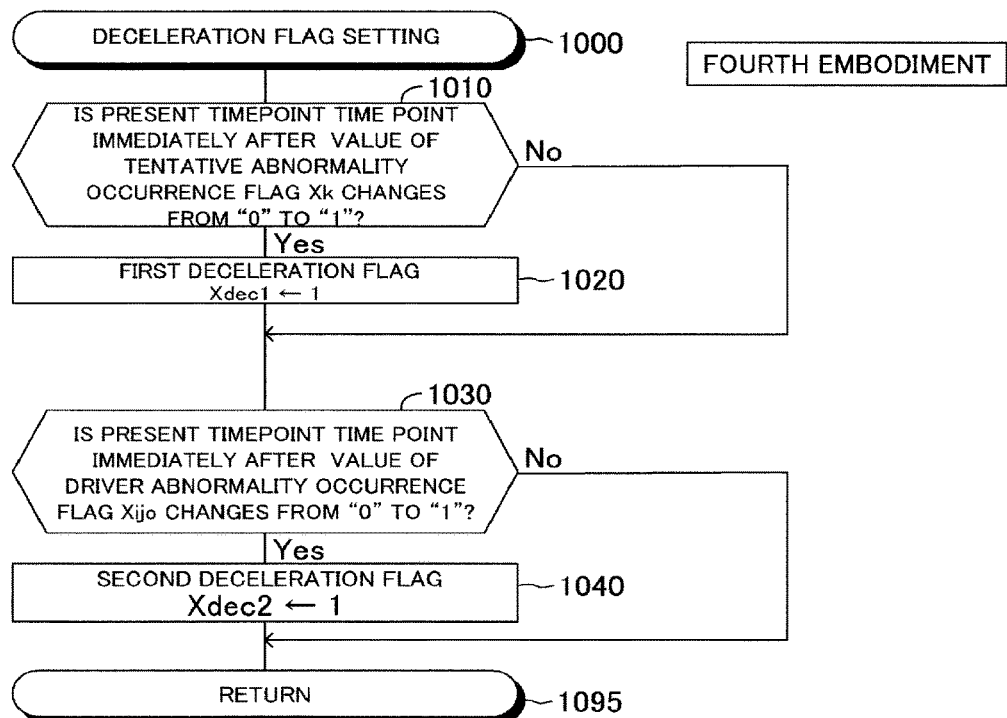
FIG. 10 is a flowchart for illustrating a routine performed by the CPU of the fourth apparatus.

When a predetermined timing arrives, the CPU starts processing with step 1000 in FIG. 10, and proceeds to step 1010 to determine whether or not the present time point is immediately after the value of the tentative abnormality occurrence flag Xk has changed from "0" to "1."

When the present time point is immediately after the value of the flag Xk has changed from "0" to "1", the CPU makes a "Yes" determination at step 1010, and proceeds to step 1020 to set the value of the first deceleration flag Xdec1 to "1." The value of the first deceleration flag Xdec1 is set to "0" in the initialization routine described above. Thereafter, the CPU proceeds to step 1030. In contrast, the present time point is not immediately after the value of the flag Xk has changed from "0" to "1", the CPU makes a "No" determination at step 1010 to directly proceed to step 1030.

At step 1040, the CPU determines whether or not the present time point is immediately after the value of the driver abnormality occurrence flag Xijo has changed from "0" to "1." When the present time is immediately after the value of the driver abnormality occurrence flag Xijo has changed from "0" to "1", the CPU makes a "Yes" determination at step 1040, and proceeds to step 1040 to set the value of the second deceleration flag Xdec2 to "1." The value of the second deceleration flag Xdec2 is also set to "0" in the initialization routine described above. Thereafter, the CPU proceeds to step 1095 to tentatively terminate the present routine. In contrast, when the present time is not immediately after the value of the driver abnormality occurrence flag Xijo has changed from "0" to "1", the CPU makes a "No" determination at step 1030, and directly proceeds to step 1095 to tentatively terminate the present routine.

<<Stop (Vehicle Deceleration) Processing>>

Figure 11:
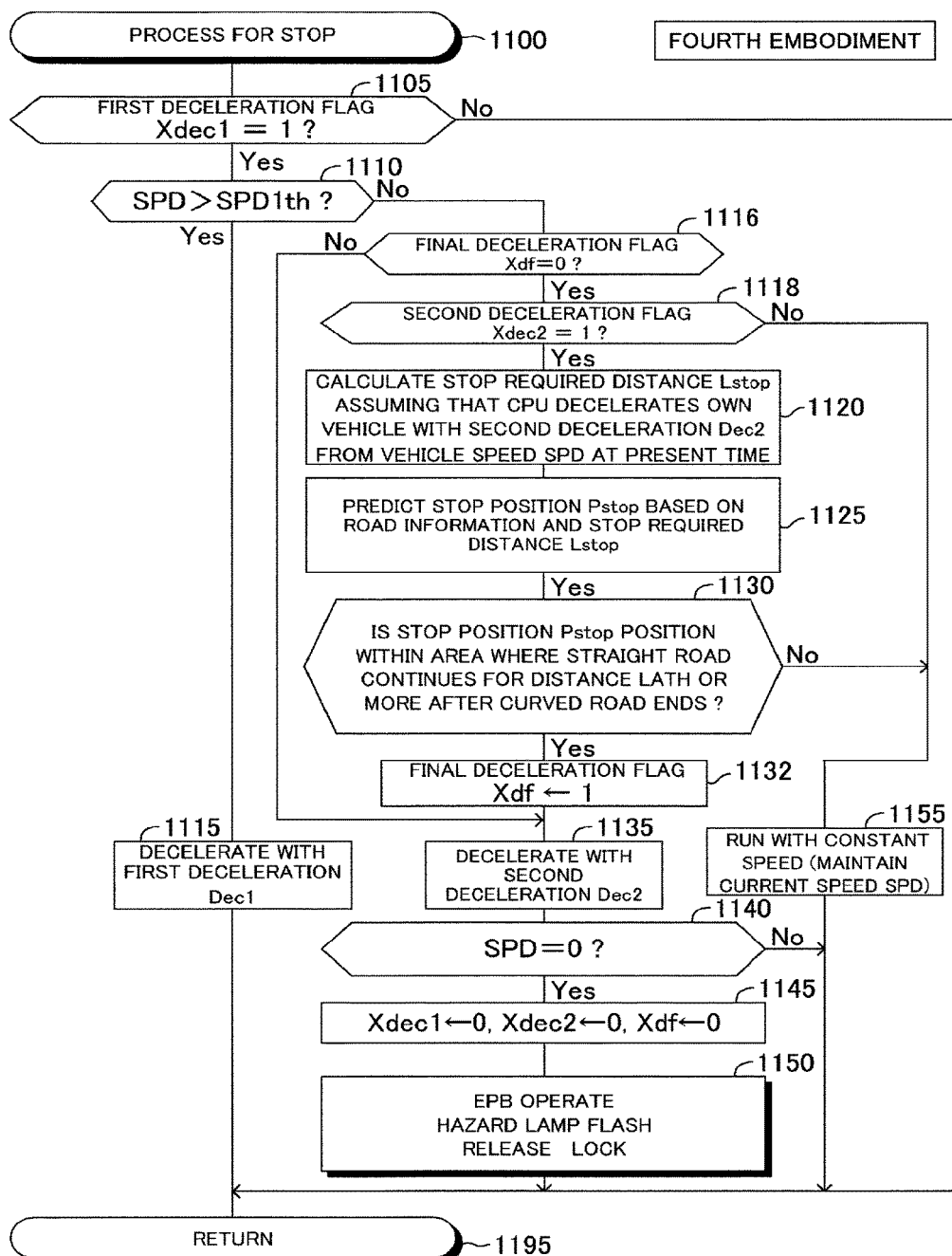
FIG. 11 is a flowchart for illustrating a routine performed by the CPU of the fourth apparatus.

When a predetermined timing arrives, the CPU starts processing with step 1100 in FIG. 11, and proceeds to step 1105 to determine whether or not the value of the first deceleration flag Xdec1 is "1". When the value of the first deceleration flag Xdec1 is not "1", the CPU makes a "No" determination at step 1105, and directly proceeds to step 1195 to tentatively terminate the present routine.

In contrast, when the value of the first deceleration flag Xdec1 is "1", the CPU makes a "Yes" determination at step 1105, and proceeds a step 1110 to determine whether or not the vehicle speed SPD is higher than the first vehicle speed SPD1$th$. Assuming that the present time point is the time point immediately after the value of the flag Xijo has changed from "0" to "1" and the value of the first deceleration flag Xdec1 has been set to "1", the vehicle speed SPD is higher than the first vehicle speed SPD1$th$. In this case, the CPU makes a "Yes" determination at step 1110, and proceeds to step 1115 to decelerate the own vehicle with/at the constant first deceleration Dec1, and proceeds to step 1195 to tentatively terminate the present routine. For example, the magnitude of the first deceleration Dec1 is 0.5 m/s$^2$.

When the own vehicle speed SPD becomes equal to the first vehicle speed SPD1$th$ owing to the repetition of those processes described above, the CPU makes a "No" determination at step 1110, and proceeds to step 1116 to determine whether or not the value of the final deceleration flag Xdf is "0." The value of the final deceleration flag Xdf is set to "0" in the initialization routine described above, and is set to "1" at step 1132 described later.

Therefore, since the value of the final deceleration flag Xdf is "0" at the time point at which the vehicle speed SPD has reached the first vehicle speed SPD1$th$ owing to the deceleration of the own vehicle, the CPU makes a "Yes" determination at step 1116, and proceeds to step 1118 to determine whether or not the value of the second deceleration flag Xdec2 is "1."

At this time point, if the value of the second deceleration flag Xdec2 is not "1" (in other words, if the value of the driver abnormality occurrence flag Xijo has not changed from "0" to "1", and thus, the step 1040 shown in FIG. 10 has not been executed), the CPU makes a "No" determination at step 1118, and proceeds to step 1155 to maintain the vehicle speed by making the own vehicle run/travel with/at the constant speed. Thereafter, the CPU proceeds to step 1195 to tentatively terminate the present routine.

In contrast, when the value of the second deceleration flag Xdec2 has been set to "1" when the CPU executes the process of step 1118 (in other words, when the value of the driver abnormality occurrence flag Xijo has changed from "0" to "1", and thus, the process of step 1040 shown in FIG. 10 has been executed until this time point), the CPU makes a "Yes" determination at step 1118, executes processes of step 1120 to step 1125 in sequence which will be described below, and proceeds to step 1130.

Step 1120: the CPU calculates a travel distance (that is, a stop required distance) Lstop(=SPD$^2$/(2·|Dec2|)) of the own vehicle from the present position to a position at which the own vehicle stops, under the assumption that the CPU decelerates the own vehicle with/at the constant deceleration Dec2 from the vehicle speed SPD (=SPD1$th$) at the present time. The magnitude of the second deceleration Dec2 is larger than the magnitude of the first deceleration Dec1. For example, the magnitude of the second deceleration Dec2 is 1 m/s$^2$.

Step 1125: the CPU obtains the position (the present position) Pnow of the own vehicle at the present time point from the navigation ECU 20, and predicts the stop position Pstop of the own vehicle at which the own vehicle will stop based on the road information acquired from the map database 22 through the navigation ECU 20 and the stop required distance Lstop.

Subsequently, the CPU proceeds to step 1130 to determine whether or not the stop position Pstop is the position within the "area where the straight road continues for the first distance Lath or more after the curved road ends" based on the road information acquired from the map database 22 through the navigation ECU 20. That is, the CPU determines whether or not the stop position Pstop predicted at step 1125 is the position outside the above-described stop prohibited area.

When the stop position Pstop is the position within the stop prohibited area, the CPU makes a "No" determination at step 1130, and proceeds to step 1155 to maintain the vehicle speed by making the own vehicle run/travel with/at the constant speed. Thereafter, the CPU proceeds to step 1195 to tentatively terminate the present routine. Therefore, in this case, the processes of steps 1120 to 1130 are repeated after the predetermined period of time elapses.

In contrast, when the stop position Pstop is the position within the stop prohibited area, the CPU makes a "No" determination at step 1130, and proceeds to step 1155 to maintain the vehicle speed by making the own vehicle run/travel with/at the constant speed. Thereafter, the CPU proceeds to step 1195 to tentatively terminate the present routine. Therefore, in this case, the processes of steps 1120 to 1130 are repeated after the predetermined period of time elapses.

Step 1132: the CPU sets the value of the final deceleration flag Xdf to "1."

Step 1135: the CPU makes the own vehicle decelerate with the constant second deceleration Dec2.

Subsequently, the CPU determines whether or not the vehicle speed SPD is "0" (that is, whether or not the own vehicle has stopped) at step 1140. At this time point, if the vehicle speed SPD is not "0", the CPU makes a "No" determination at step 1140, and directly proceeds to step 1195 to tentatively terminate the present routine.

Thereafter, when the CPU again executes the present routine, the CPU makes a "Yes" determination at step 1105, makes a "No" determination at step 1110, and makes a "No" determination at step 1116 to proceed to step 1135, since the value of the final deceleration flag Xdf has been set to "1." Therefore, the own vehicle is continued to be decelerated with/at the second deceleration Dec2.

The repetition of those processes makes the vehicle speed SPD equal to "0." In this case, when the CPU executes the present routine, the CPU makes a "Yes" determination at step 1140, performs processes of step 1145 and step 1150 in sequence which will be described below, and proceeds to step 1195 to tentatively terminate the present routine.

Step 1145: the CPU sets each of the value of the first deceleration flag Xdec1, the value of the second deceleration flag Xdec2, and the value of the final deceleration flag Xdf to "0."

Step 1150: the CPU applies a parking brake force to the wheels using EPB-ECU 50. That is, the driving support ECU 10 maintains the own vehicle in a stop state. Moreover, the CPU makes the hazard lamp 71 flash using the meter ECU 70, and releases locks of doors of the own vehicle using a non-illustrated door lock ECU.

As described above, the fourth apparatus makes the tentative abnormality determination "that is, the fourth apparatus sets the value of the tentative abnormality occurrence flag Xk to "1"" when there is some doubt that the driver falls into the abnormal state of losing driving ability, and gradually decelerates with/at the constant the first deceleration Dec1 until the vehicle speed SPD reaches the first vehicle speed SPD1*th*. Accordingly, a safe driving of the own vehicle can be secured earlier.

Further, when the determination that the driver is in the abnormal state of losing driving ability has been confirmed/finalized (that is, the fourth apparatus has set the value of the driver abnormality occurrence flag Xijo to "1") until the vehicle speed SPD reaches the first vehicle speed SPD1*th*, the fourth apparatus predicts the stop position of the own vehicle when the fourth apparatus relatively rapidly decelerates the own vehicle with the constant second deceleration Dec2 after the time point at which the determination is confirmed. When the fourth apparatus determines that the stop position of the own vehicle is a position within the stop prohibited area, the fourth apparatus makes the own vehicle run/travel at the constant speed. When the fourth apparatus determines that the stop position of the own vehicle is not the position within the stop prohibited area, the fourth apparatus stops the own vehicle by making the own vehicle decelerate with the constant second deceleration Dec2.

Further, when the determination that the driver is in the abnormal state of losing driving ability has not yet made (that is, when the fourth apparatus has not set the value of the driver abnormality occurrence flag Xijo to "1") at the time point at which the vehicle speed SPD has reached the first speed SPD1*th*, the fourth apparatus makes the own vehicle run/travel with/at the constant speed until the determination is made. Thereby, it is possible to secure a time period for which it makes the determination that the driver is in the abnormal state of losing driving ability, and to stop the own vehicle after at the time point at which the determination has been confirmed/finalized.

Fifth Embodiment

Next, a vehicle running control apparatus according to the fifth embodiment of the present invention (hereinafter, may be referred to as a "fifth apparatus") will be described. The fifth apparatus differs from the fourth apparatus only in that the fifth apparatus defines, as the stop prohibited area, an area within a predetermined second distance Lbth from a pass (highest) point Ptop, as shown in (A) of FIG. 12. The pass point Ptop is a point at which a gradient of a road changes from an ascending gradient to a descending gradient (a slope of a road changes from an upslope to a downslope).

(Concrete Operation)

Next, the concrete operation of the CPU of the ECU 10 according to the fifth apparatus will be described. The CPU is configured to execute each of routines shown by flowcharts in FIG. 9 and FIG. 10 every time a predetermined period of time elapses. Further, the CPU is configured to perform a routine in which step 1130 of FIG. 11 is replaced with step 1210 shown in (B) of FIG. 12 every time the predetermined period of time elapses. Therefore, those differences will be mainly described, hereinafter.

Figure 12:
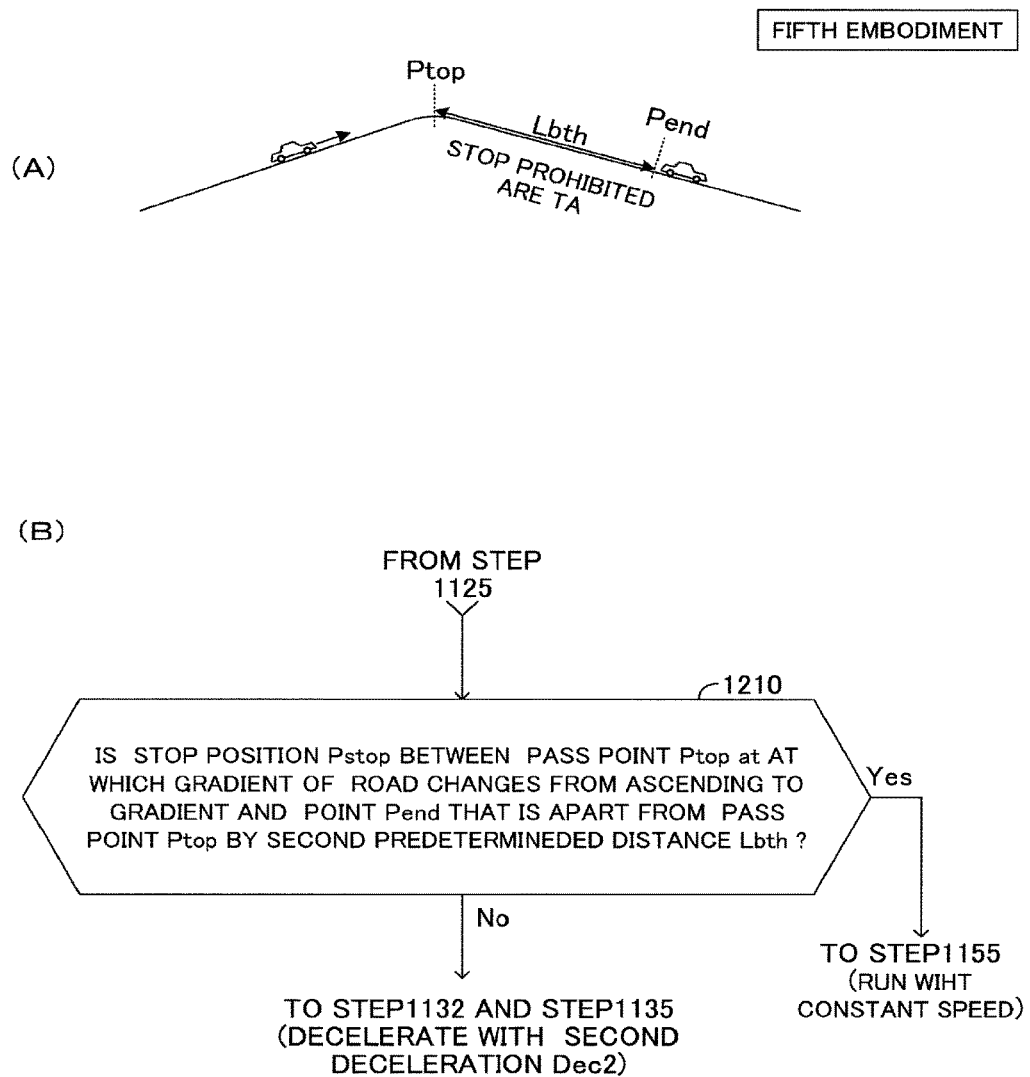
FIG. 12 includes (A) and (B), wherein, (A) of FIG. 12 is a figure for describing an operation of a vehicle running control apparatus (a fifth apparatus) according to a fifth embodiment of the present invention, and (B) of FIG. 12 is one step of a routine performed by a CPU of the fifth apparatus.

After the CPU predicts a stop position Pstop at step 1125 in FIG. 11, the CPU proceeds to step 1210 shown in (B) of FIG. 12 to determine whether or not the stop position Pstop is a position in a stop prohibited area TA between the "pass point Ptop at which the gradient/slope of a road changes from an ascending gradient (uphill/upslope) to a descending gradient (downhill/downslope)" and a "point Pend that is apart from the pass point Ptop by the second predetermined distance Lbth."

If the stop position Pstop is a position in the stop prohibited area TA, the CPU makes a "Yes" determination at step 1210, and proceeds to step 1155 in FIG. 11 to make the own vehicle run with/at the constant speed. In contrast, if the stop position Pstop is not the position in the stop prohibited area TA, the CPU makes a "No" determination at step 1210, and proceeds to step 1135 via step 1132 shown in FIG. 11 to decelerate the own vehicle with/at the constant second deceleration Dec2.

As described above, the fifth apparatus does not stop the own vehicles immediately after the own vehicle passes the pass point. Accordingly, when the driver of the following vehicle which has passed the pass point finds/recognizes the stopped own vehicle, the driver of the following vehicle can decelerate or stop the following vehicle, without applying a sudden brake to the following vehicle.

It should be noted that the fifth apparatus may be combined with one of the first to fourth apparatuses. That is, the CPU of the first apparatus may proceed to 1210 when a "No" determination is made at step 535, and the CPU may proceed to step 545 when a "No" determination is made at step 1210. The CPU of the second apparatus may proceed to 1210 when a "No" determination is made at step 735, and the CPU may proceed to step 745 when a "No" determination is made at step 1210. The CPU of the third apparatus may proceed to 1210 when a "No" determination is made at step 835, and the CPU may proceed to step 845 when a "No" determination is made at step 1210. The CPU of the fourth apparatus may proceed to 1210 when a "Yes" determination is made at step 1130, and the CPU may proceed to step 1132 when a "No" determination is made at step 1210.

Sixth Embodiment

Next, a vehicle running control apparatus according to the sixth embodiment of the present invention (hereinafter, may be referred to as a "sixth apparatus") will be described. As shown in (A) and (B) of FIG. 13, when the sixth apparatus determines that the driver has fallen into the abnormal state of losing driving ability, the sixth apparatus determines/specifies a stop position Pstop at which the own vehicle stops (the vehicle speed SPD=0) by decelerating the own vehicle with/at a constant deceleration Dec from the speed SPDnow of the own vehicle at the time (abnormality determination time point).

The sixth apparatus obtains information about the shape of the road between the present position Pnow and the stop position Pstop from the map database 22 through the navigation ECU 20. This information about the shape of the road includes the curvature radius R of the road for each section of the road (road section) between the present position Pnow and the stop position Pstop. In other words, the ECU obtains a curvature radius R(px) of the road at a point px at which the own vehicle arrives when it runs/travels/advances for a distance x from the present position Pnow.

The sixth apparatus calculates a lower limit vehicle speed SL(px) at the point px based on the curvature radius R(px) of the road. As the curvature radius R(px) is smaller, the curved road becomes steeper. Therefore, the visibility becomes poorer (that is, a distance in which a driver of the following vehicle can visually recognize a preceding vehicle becomes shorter) as the curvature radius R(px) is smaller. In view of the above, the lower limit vehicle speed SL(px) is set to a value which becomes higher as the curvature radius R(px) becomes smaller. The lower limit vehicle speed SL(px) is set to a value in such a manner that, if the own vehicle runs/travels with/at a speed which is lower than the lower limit vehicle speed SL(px), the driver of the following vehicle needs to apply a sudden brake to the following vehicle immediately after the driver of the following vehicle finds/recognize the own vehicle.

The sixth apparatus determines whether or not the speed SPD(px) of the own vehicle becomes lower than the lower limit vehicle speed SL(px) between the present position Pnow and the stop position Pstop. For example, in an example shown in (A) of FIG. 13, a point(px) does not exist, at which the vehicle speed SPD(px) becomes lower than the lower limit vehicle speed SL(px) until the own vehicle stops. Therefore, in this case, the ECU 10 immediately begins to decelerate the own vehicle with/at the constant deceleration Dec.

Figure 13:
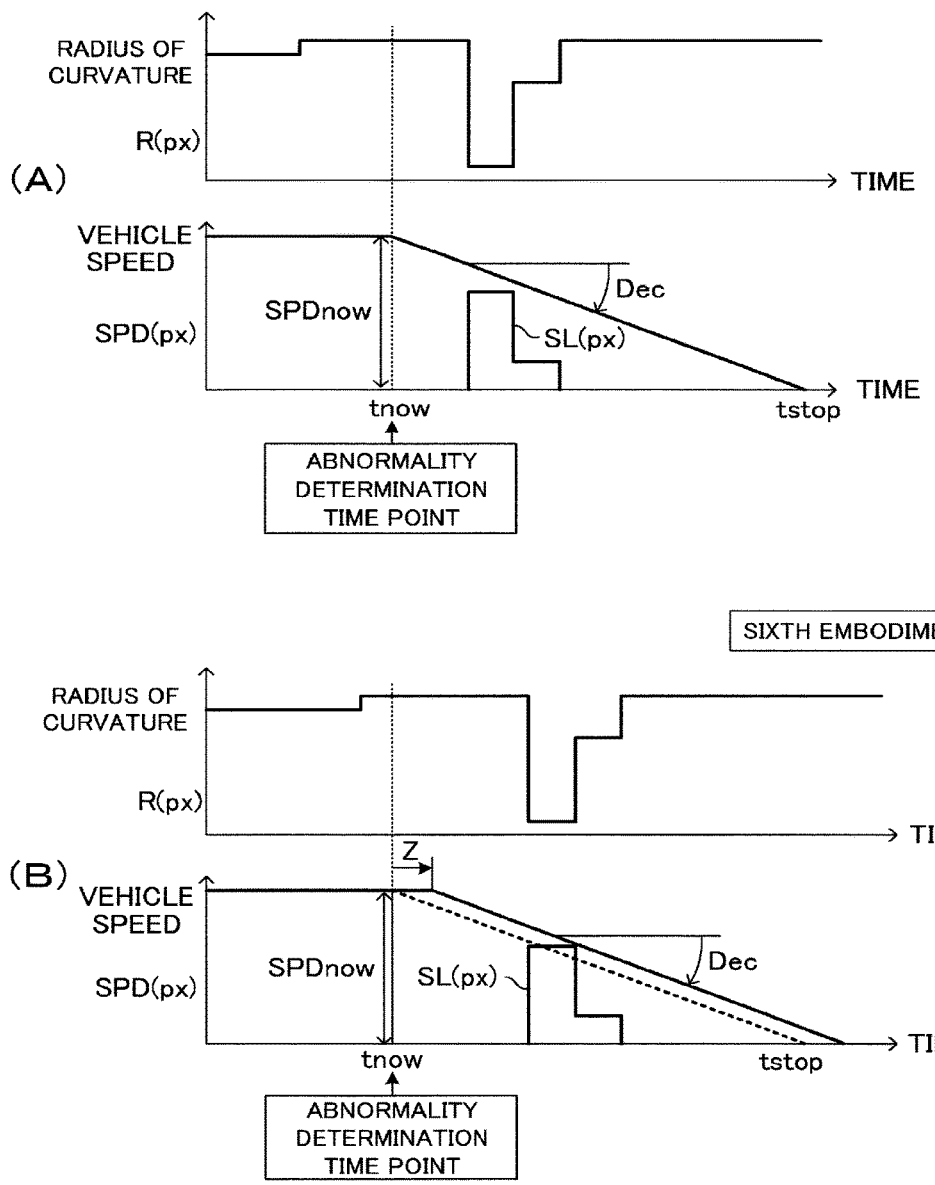
FIG. 13 includes (A) and (B), wherein (A) and (B) of FIG. 13 are timing charts for illustrating an operation of a vehicle running control apparatus (a sixth apparatus) according to a sixth embodiment of the present invention.

In contrast, in an example shown by the dashed line in (B) of FIG. 13, the point px exists, at which the vehicle speed SPD(px) becomes lower than the lower limit vehicle speed SL(px) until the own vehicle stops. Accordingly, as shown by the solid line in (B) of FIG. 13, the sixth apparatus delays a time point from which it begins to decelerate the own vehicle with/at the constant deceleration Dec so that the vehicle speed SPD(px) may not become lower than the lower limit vehicle speed SL(px) until the own vehicle stops.

According to this configuration, a situation that the own vehicle (that is, deceleration target vehicle) whose driver has been in the abnormal state of losing driving ability run/travels at an excessively low speed on the sharp/steep curved road providing the poor visibility does not arise. Thus, the driver of the following vehicle can decelerate or stop the following vehicle without applying the sudden brake to the following vehicle when the driver of the following vehicle finds/recognizes the own vehicle.

Further, when the own vehicle has passed an end point of the curved road having the curvature radius R, the speed of the own vehicle is higher than or equal to the lower limit vehicle speed corresponding to the curvature radius R. Furthermore, the own vehicle is decelerated with/at the predetermined deceleration (in this example, the constant deceleration Dec) with an initial speed higher than the lower limit vehicle speed, from a time point at which the own vehicle goes into a straight road from the curved road. As a result, the own vehicle does not stop on the curved road, and stops after it certainly runs/travels for the first predetermined distance Lath on the straight road. The above description is the outline of the operation of the sixth apparatus.

(Concrete Operation)

Next, the concrete operation of the CPU of the ECU 10 according to the sixth apparatus will be described. The CPU is configured to execute each of routines shown by flowcharts in FIGS. 3, 14, and 15, every time a predetermined period of time elapses. Since the flowchart of FIG. 3 has been described, the operation based on the flowcharts of FIG. 14 and FIG. 15 will be hereinafter described.

<<Vehicle Deceleration Start Processing>>

Figure 14:
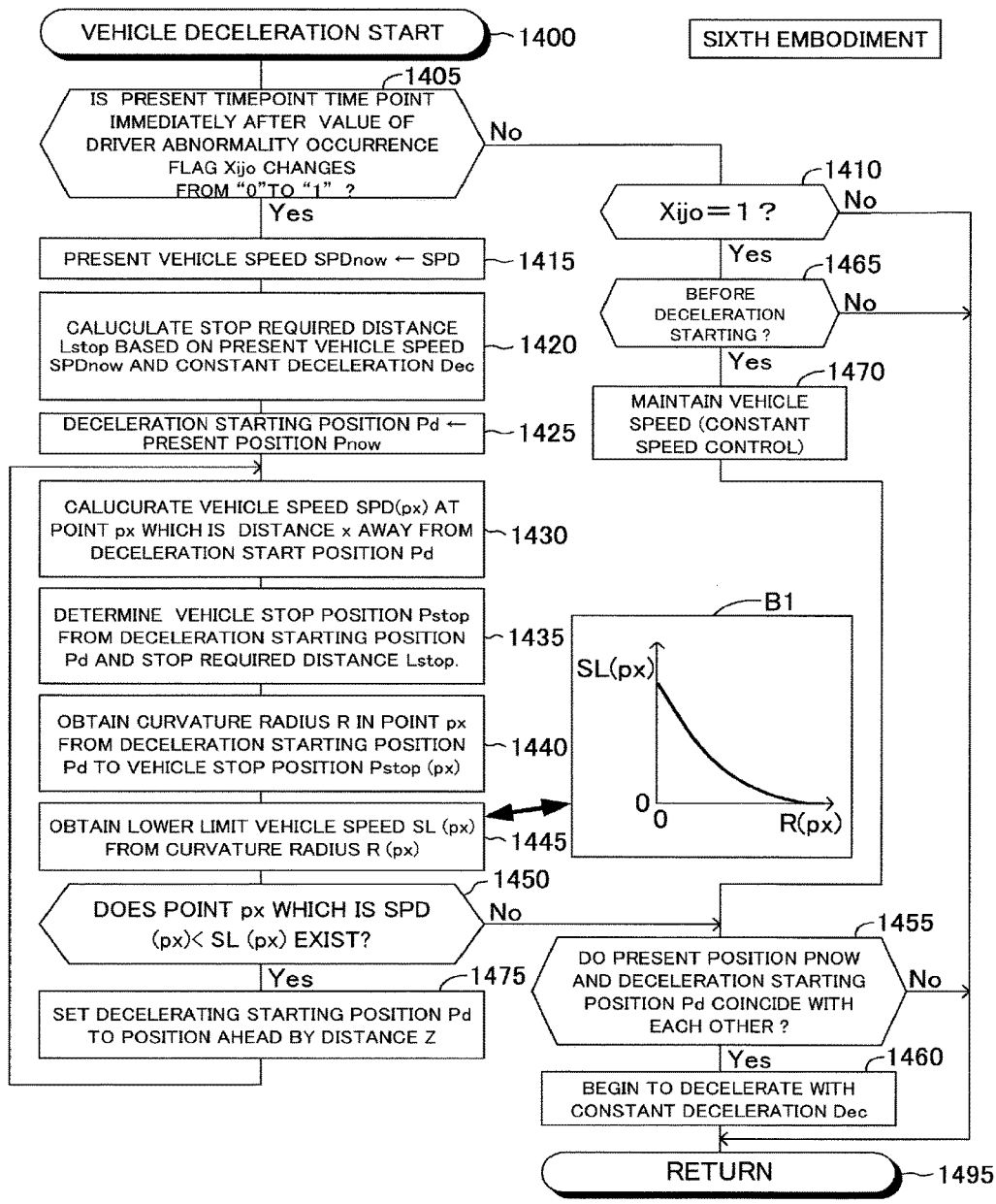
FIG. 14 is a flowchart for illustrating a routine performed by the CPU of the sixth apparatus.

When a predetermined timing arrives, the CPU starts processing with step 1400 in FIG. 14, and proceeds to step 1405 to determine whether or not the present time point is immediately after the value of the driver abnormality occurrence flag Xijo has changed to "1" from "0."

If the driver has not fallen into the abnormal state of losing driving ability after a current start of driving the own vehicle, the value of the flag Xijo remains "0". In this case, the CPU makes a "No" determination at step 1405, and also makes a "No" determination at step 1410 at which the CPU determines whether or not the value of flag Xijo is "1" to directly proceed to step 1495 to tentatively terminate the present routine. Therefore, in this case, a forced deceleration of the own vehicle is not performed.

On the other hand, when the driver is determined to have fallen into the abnormal state of losing driving ability after the current start of driving the own vehicle, the value of flag Xijo is changed to "1" from "0." Immediately after this, the CPU makes a "Yes" determination at step 1405, performs processes of step 1415 to step 1445 in sequence which will be described below, and proceeds to step 1450.

Step 1415: the CPU stores a vehicle speed SPD obtained based on the signal from the vehicle speed sensor 16, as a present vehicle speed SPDnow.

Step 1420: the CPU calculates a travel distance (that is, a stop required distance) Lstop ($=SPDnow^2/(2\cdot|Dec|)$) of the own vehicle from the present position to a position at which the own vehicle stops, under an assumption that the own vehicle is decelerated with/at the constant deceleration Dec from the initial vehicle speed SPDnow.

Step 1425: the CPU obtains the present position Pnow from the navigation ECU 20, and stores it as a deceleration starting position Pd.

Step 1430: the CPU calculates a vehicle speed SPD(px) at a point px which is a distance x away from the deceleration starting position Pd within a section from the deceleration starting position Pd to a point ahead by the required stopping distance Lstop, under an assumption that the own vehicle will be decelerated while maintaining the constant deceleration Dec with the initial speed SPDnow.

Step 1435: the CPU determines/specifies a position Pstop (hereinafter, referred to as a "vehicle stop position") at which the own vehicle is expected to stop based on the deceleration starting position Pd and the stop required distance Lstop.

Step 1440: the CPU obtains the curvature radius R(px) at the point px from the deceleration starting position Pd to the vehicle stop position Pstop from the map database 22 through the navigation ECU 20. In the map database 22, the curvature radius has been set up for every road section.

Step 1445: the CPU obtains the lower limit vehicle speed SL(px) at the point px by applying the curvature radius R(px) to a look-up table MapSL(R) shown in a block B1 of FIG. 14. According to the table MapSL(R), the lower limit vehicle speed SL(px) is obtained as a value which becomes larger as the curvature radius R(px) becomes smaller. It should be noted that, since the curvature radius is set up for every road section in the map database 22, the lower limit vehicle speed SL(px) is obtained for every road section. In other words, the lower limit vehicle speed SL(px) does not vary (it is a constant value) in the same road section.

Next, the CPU proceeds to step 1450 to determine whether or not the point px at which the vehicle speed SPD(px) is lower than the lower limit vehicle speed SL(px) exists. When the point px at which the vehicle speed SPD(px) is lower than the lower limit vehicle speed SL(px) does not exist (refer to (A) of FIG. 13), the CPU makes a "No" determination at step 1450, and proceeds to step 1455 to determine whether or not the present position Pnow of the own vehicle and the deceleration starting position Pd of the own vehicle coincide with each other. In this case, since the present position Pnow and the deceleration starting position Pd coincide with each other owing to the process of the previous step 1425, the CPU makes a "Yes" determination at step 1455, and proceeds to step 1460 to begin to decelerate the own vehicle with/at the constant deceleration Dec.

When the CPU again performs the process of step 1405 in this state, the CPU makes a "No" determination at step 1405, and proceeds to step 1410 to makes a "Yes" determination at step 1410. Thereafter, the CPU proceeds to step 1465 to determine whether the present time point is before a start of the deceleration with/at the constant deceleration Dec. The own vehicle is decelerating at this point in time. Therefore, the CPU makes a "No" determination at step 1465, and directly proceeds to step 1495 to tentatively terminate the present routine.

In contrast, if the point px having the vehicle speed SPD(px) lower than the lower limit vehicle speed SL(px) exists (refer to the short dashed line of (B) of FIG. 13), the CPU makes a "Yes" determination at step 1450, and proceeds to step 1475 to set the decelerating starting position Pd to a position ahead of the current decelerating starting position Pd by a distance Z. Thereafter, the CPU repeats the processes of step 1430 to step 1450. Subsequently, when it is still determined that the point px having the vehicle speed SPD(px) lower than the lower limit vehicle speed SL(px) still exists at step 1450, the CPU sets the deceleration starting position Pd to a position further ahead of the current decelerating starting position Pd by the distance Z by the process of step 1475, and repeats the processes of step 1430 to step 1450. If the point px having the vehicle speed SPD(px) lower than the lower limit vehicle speed SL(px) does not exist when repeating the such processes, the CPU proceeds to step 1455 from step 1450.

Since, at this point in time, the present position Pnow and the deceleration starting position Pd do not coincide with each other, the CPU makes a "No" determination at step 1455, and directly proceeds to step 1495 to tentatively terminate the present routine. Thereafter, when the CPU proceeds to step 1405 again, the CPU makes a "No" determination at step 1405, and makes a "Yes" determination at the subsequent step 1410, and further makes a "Yes" determination at the subsequent step 1465 to proceed to step 1470. At step 1470, the CPU makes the own vehicle run/travel with a constant speed so as to maintain the vehicle speed at that time point. Then, the CPU proceeds to step 1455. Therefore, the CPU makes a "Yes" determination at step 1455 to proceed to step 1460 at a time point at which the present position Pnow of the own vehicle and the deceleration starting position Pd coincide with each other, and begins to decelerate the own vehicle with/at the constant deceleration Dec.

<<A process for Ending/Terminating the Vehicle Deceleration>>

Figure 15:
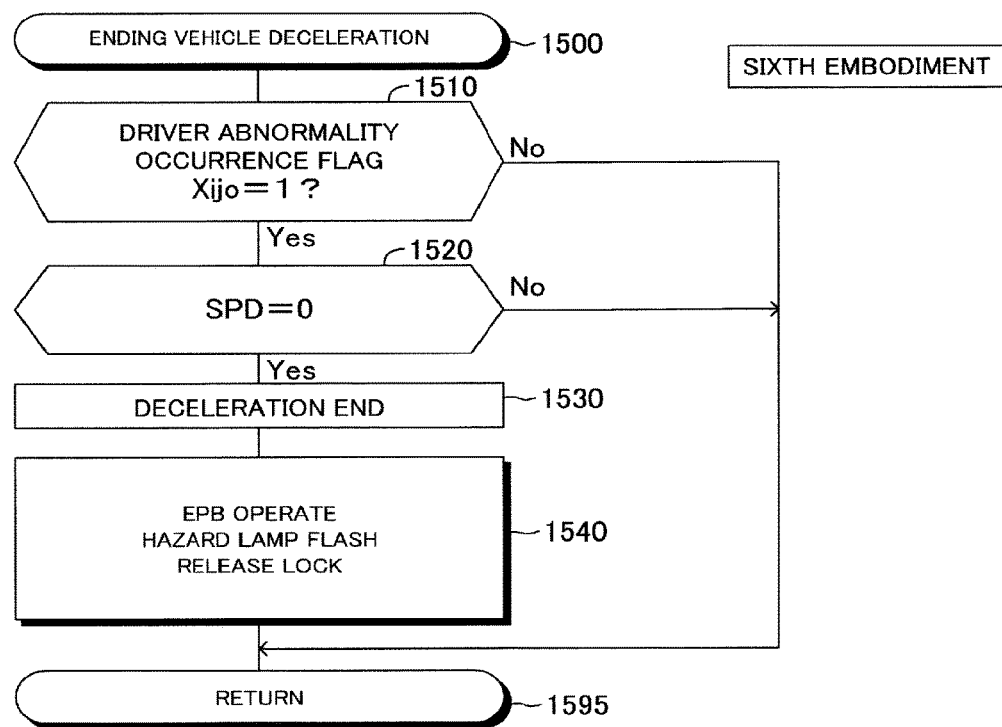
FIG. 15 is a flowchart for illustrating a routine performed by the CPU of the sixth apparatus.

Further, when a predetermined timing arrives, the CPU starts processes with step 1500 in FIG. 15, and proceeds to step 1510 to determine whether or not the value of the flag Xijo is "1." When the value of the flag Xijo is not "1" (when it is "0"), the CPU makes a "No" determination at step 1510, and directly proceeds to step 1595 to tentatively terminate the present routine.

In contrast, when the value of the flag Xijo is "1", the CPU makes a "Yes" determination at step 1510, and proceeds to step 1520 to determine whether or not the vehicle speed SPD of the own vehicle is "0" (that is, whether or not the own vehicle has stopped). When the vehicle speed SPD of the own vehicle is not "0", the CPU makes a "No" determination at step 1520, and directly proceeds to step 1595 to tentatively terminate the present routine.

In contrast, when the vehicle speed SPD is "0", the CPU makes a "Yes" determination at step 1520, and performs processes of step 1530 to step 1540 in sequence which will be described below, and proceeds to step 1595 to tentatively terminate the present routine.

Step 1530: the CPU stops the deceleration of the own vehicle.

Step 1540: the CPU applies the parking brake force to the wheels using EPB ECU 50. That is, the driving support ECU 10 maintains the own vehicle in the stop state. Further, the CPU makes the hazard lamp 71 flash using the meter ECU 70, and releases the locks on the doors of the vehicle using the non-illustrated door lock ECU.

As described above, in the period from the abnormality determination time point to the time point at which the vehicle whose driver falls into the abnormal state of losing driving ability (that is, the deceleration target vehicle) stops, the sixth apparatus decelerates the deceleration target vehicle while controlling the vehicle speed of the deceleration target vehicle in such a manner that the vehicle speed of the deceleration target vehicle does not become lower than the lower limit vehicle speed which is set according to the radius of curvature indicating the shape of the road on which the deceleration target vehicle is running (the shape of the road on which the deceleration target vehicle is running is a shape of the road that affects the timing at which the driver of the following vehicle of the deceleration target vehicle finds/recognizes the deceleration target vehicle). Further, the sixth apparatus sets the lower limit vehicle speed in such a manner that the lower limit vehicle speed becomes higher as the radius of curvature becomes smaller.

In addition, the sixth apparatus determines the deceleration starting position in such a manner that the vehicle speed does not become lower than the lower limit vehicle speed which is set up for every road section until the deceleration target vehicle stops, even if the sixth apparatus decelerates the deceleration target vehicle with/at the constant deceleration after the abnormality determination time point.

Therefore, since the vehicle speed of the deceleration target vehicle does not become excessively low when it is running on the curved road with poor visibility, the driver of the following vehicle can decelerate the following vehicle without applying the sudden brake to the following vehicle even if a timing at which the driver of the following vehicle finds/recognizes the deceleration target vehicle is delayed. Moreover, since the deceleration target vehicle passes through the curved road at the vehicle speed higher than or equal to the lower limit vehicle speed, the deceleration target vehicle does not stop immediately after it enters (goes into) the straight road from the curved road, and stops after it travels for a predetermined distance (the first predetermined distance) after it enters the straight road. As a result, when the driver of the following vehicle finds/recognizes the deceleration target vehicle which has stopped, the driver of the following vehicle can decelerate or stop the following vehicle without applying the sudden brake to the following vehicle.

Seventh Embodiment

Next, a vehicle running control apparatus according to the seventh embodiment of the present invention (hereinafter, may be referred to as a "seventh apparatus") will be described. When the seventh apparatus has determined that the driver has fallen into the abnormal state of losing driving ability, it obtains information on shapes of a road between the present position Pnow and a tentative stop position Ptstop which is ahead by a sufficient distance for the vehicle to stop (hereinafter referred to as a "predicted maximum distance for stop") from the map database 22 through the navigation ECU 20. This information about the shapes of the road also includes the curvature radius R for every road section between the present position Pnow and the tentative stop position Ptstop. In other words, the ECU 10 obtains the curvature radius R(px) of the road at the point px. Subsequently, the seventh apparatus obtains/calculates the lower limit vehicle speed SL(px) at the point px which is ahead by a distance x from the present position Pnow based on the curvature radius R(px).

Figure 16:
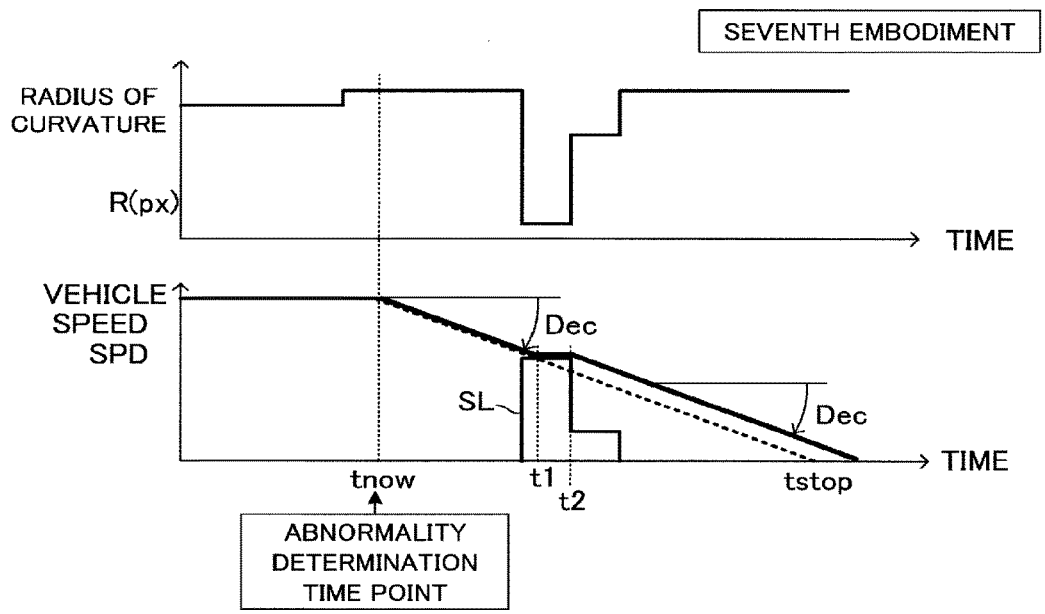
FIG. 16 is a timing chart for illustrating an operation of a vehicle running control apparatus (a seventh apparatus) according to a seventh embodiment of the present invention.

The seventh apparatus calculates/obtains a vehicle speed SL(px) at the point px under an assumption that it decelerates the own vehicle with/at a constant deceleration Dec. When it is predicted that the vehicle speed SL(px) is lower than the lower limit vehicle speed SL(px), the seventh apparatus temporarily terminates the deceleration of the own vehicle to maintain the vehicle speed (refer to the solid line in FIG. 16) in a period in which the vehicle speed SL(px) is predicted to be lower than the lower limit vehicle speed SL(px) (refer to the dashed line in FIG. 16 between time t1 and time t2). Thereafter, when vehicle speed SL(px) becomes in a state in which the vehicle speed SL(px) is higher than or equal to the lower limit vehicle speed SL(px), the seventh apparatus resumes the deceleration of the own vehicle with/at the constant deceleration Dec. At the abnormality determination time point, the seventh apparatus calculates a target vehicle speed SPDtgt for decelerating the own vehicle in the above manner. The seventh apparatus gradually decelerates the own vehicle while keeping the vehicle speed SPD of the own vehicle equal to the target vehicle speed SPDtgt after the abnormality determination time point. The above description is the outline the operation of the seventh apparatus.

(Concrete Operation)

Next, the concrete operation of the CPU of the ECU 10 according to the seventh apparatus will be described. The CPU is configured to execute each of routines shown by flowcharts in FIG. 3, FIG. 15, and FIG. 17 every time a predetermined period of time elapses. Since the flowcharts of FIG. 3 and FIG. 15 have been already described, the operation (a vehicle deceleration process) based on the flowchart of FIG. 17 will be described, hereinafter.

Figure 17:
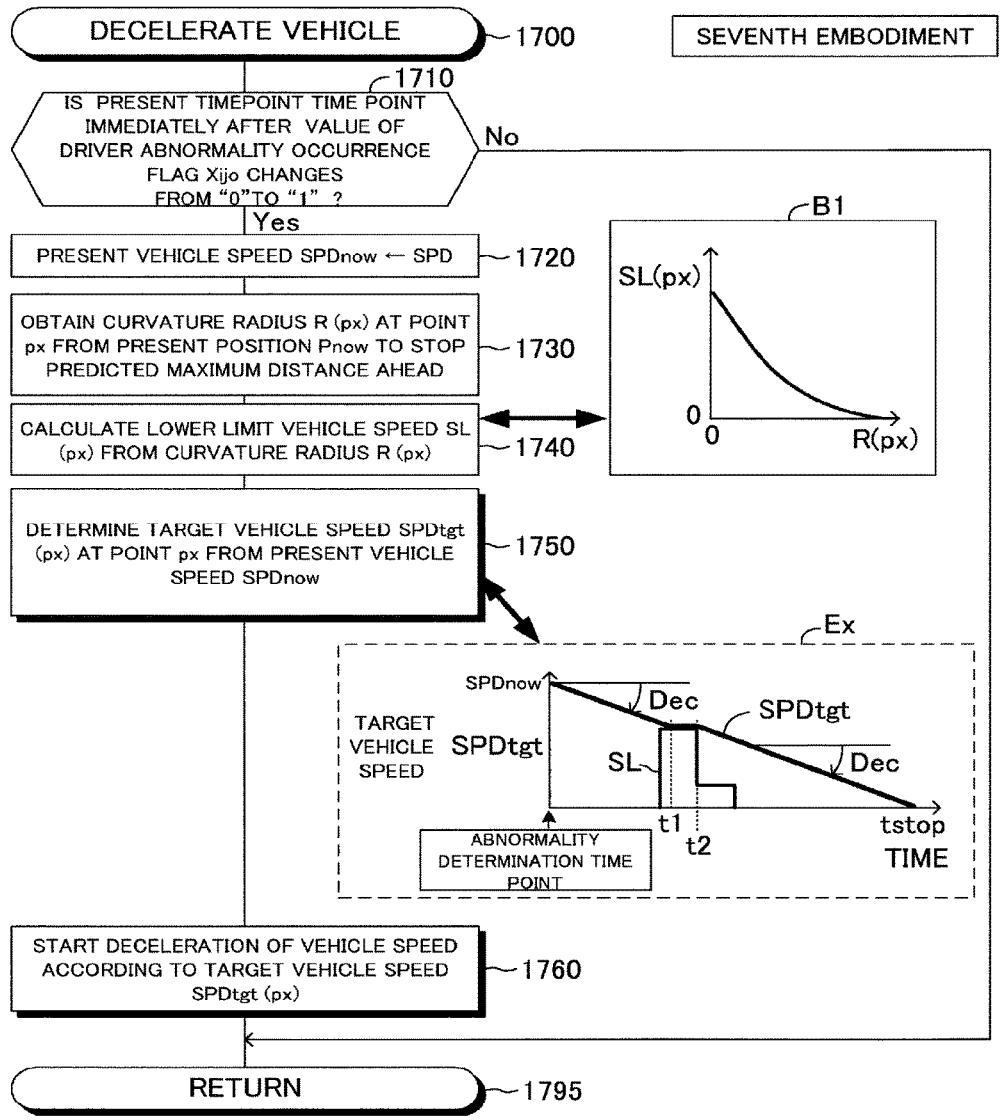
FIG. 17 is the flowchart for illustrating a routine performed by the CPU of the seventh apparatus.

When a predetermined timing arrives, the CPU starts processing with step 1700 in FIG. 17, and proceeds to step 1710 to determine whether or not the present time point is immediately after the value of the driver abnormality occurrence flag Xijo has changed from "0" to "1." If the driver has not fallen into the abnormal state of losing driving ability after a current start of driving the own vehicle, the value of the flag Xijo is "0." In this case, the CPU makes a "No" determination at step 1710, and directly proceeds to step 1795 to tentatively terminate the present routine. Therefore, in this case, a forced deceleration of the own vehicle is not performed.

In contrast, when the time point at which the CPU performs the process of step 1710 is immediately after the value of Flag Xijo has changed to "1" from "0", the CPU makes a "Yes" determination at step 1710, performs processes of step 1720 to step 1760 in sequence which will be described below, and proceeds to step 1795 to tentatively terminate the present routine.

Step 1720: the CPU stores the vehicle speed SPD obtained based on the signal from the vehicle speed sensor 16, as the present vehicle speed SPDnow.

Step 1730: the CPU obtains the curvature radius R(px) at the point px from the present vehicle position Pnow to the tentative vehicle stop position Ptstop described above through the navigation ECU 20. As described before, the curvature radius has been set up for every road section in the map database 22.

Step 1740: the CPU obtains the lower limit vehicle speed SL(px) at the point px by applying the curvature radius R(px) to a look-up table MapSL(R) shown in a block B1 of FIG. 17. According to the table MapSL(R), the lower limit vehicle speed SL(px) is obtained as a value which becomes larger as the curvature radius R(px) becomes smaller. As described above, the lower limit vehicle speed SL(px) is obtained for every road section.

Step 1750: the CPU determines the target vehicle speed SPDtgt under an assumption that it decelerate the own vehicle with/at the constant deceleration Dec from the present vehicle speed SPDnow (refer to the timing chart in a block Ex of FIG. 17), according to the method described above.

Step 1760: the CPU performs processes necessary for gradually decreasing the vehicle speed of the own vehicle according to the target vehicle speed SPDtgt which was determined at step 1750. As a result, in the example shown in the timing chart in the block Ex of FIG. 17, the own vehicle is made run/travel at a constant speed between the time t1 and the time t2, but the own vehicle is decelerated while maintaining the constant deceleration Dec in the other periods.

As described above, the seventh apparatus decelerates the deceleration target vehicle with/at the constant deceleration from the abnormality determination time point, and temporarily terminates the deceleration of the deceleration target vehicle to maintain the vehicle speed of the vehicle during the period in which the vehicle speed of the vehicle is predicted to become lower than the lower limit vehicle speed which is set for each of the road sections in the period from the abnormality determination time point to the time point at which the vehicle is stopped.

Therefore, the vehicle speed of the deceleration target vehicle can be controlled in such a manner that the vehicle speed does not become lower than the lower limit vehicle speed, and the deceleration can be continued when the vehicle speed of the deceleration target vehicle is higher than the lower limit vehicle speed. As a result, the vehicle speed of the deceleration target vehicle can be reduced as much as possible, while preventing the vehicle speed of the deceleration target vehicle from falling below the lower limit vehicle speed. Further, since the deceleration target vehicle passes through the curved road at the vehicle speed higher than or equal to the lower limit vehicle speed, the vehicle does not stop immediately after it enters the straight road from the curved road, but the vehicle stops when it travels for the predetermined distance (first predetermined distance) after it enters the straight road. As a result, when the driver of the following vehicle finds/recognizes the deceleration target vehicle which has been stopped, the driver of the following vehicle can decelerate or stop the following vehicle without applying the sudden brake to the following vehicle.

Eighth Embodiment

Figure 18:
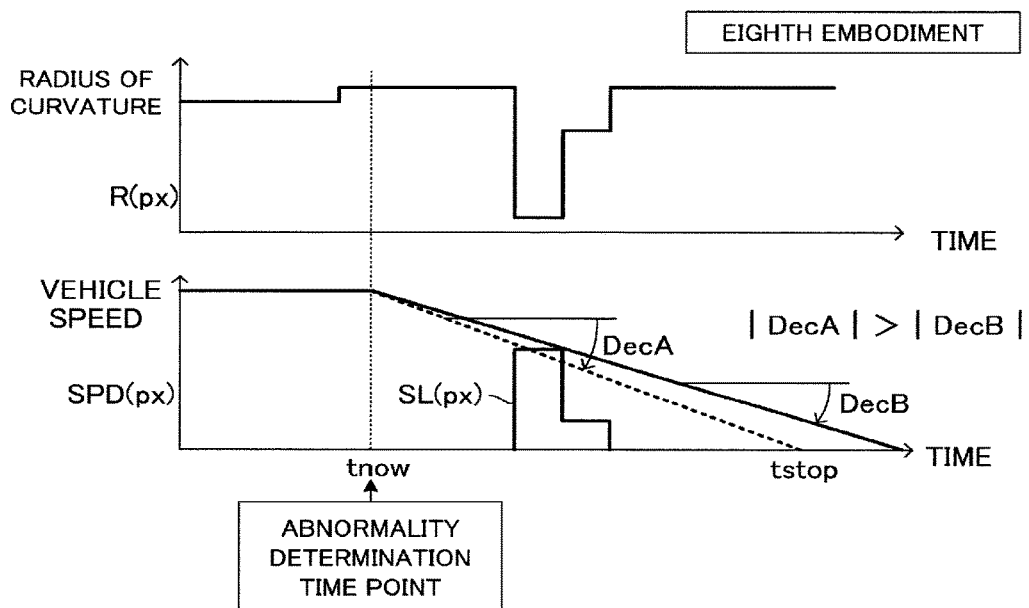
FIG. 18 is a timing chart for illustrating an operation of a vehicle running control apparatus (an eighth apparatus) according to an eighth embodiment of the present invention.

Next, a vehicle running control apparatus according to the eighth embodiment of the present invention (hereinafter, may be referred to as an "eighth apparatus") will be described. Similarly to the sixth apparatus, when the eighth apparatus has determined that the driver of the own vehicle has fallen into the abnormal state of losing driving ability, the eight apparatus determines whether or not a point px at which the vehicle speed SPD(px) becomes lower than the lower limit vehicle speed SL(px) exists between a time point at which the own vehicle is started to be decelerated with/at a constant deceleration Dec (=DecA) to a time point at which the own vehicle stops. When the point px exists where the vehicle speed SPD(px) becomes lower than the lower limit vehicle speed SL(px), as shown by a dashed line in FIG. 18, the eighth apparatus calculates a deceleration which prevents the speed SPD(px) from becoming lower than the lower limit vehicle speed SL(px) in a period until the own vehicle stops, by reducing a magnitude of the deceleration used when the own vehicle is being decelerated, as shown by a solid line in FIG. 18 (that is, |DecB|<|DecA|). Thereafter, the eight apparatus decelerates the own vehicle with/at the calculated deceleration.

This eighth apparatus can also allow the driver of the following vehicle to decelerate or stop the following vehicle without applying the sudden brake to the following vehicle, when the driver finds/recognizes the deceleration target vehicle. Moreover, since the deceleration target vehicle passes through the curved road at the vehicle speed higher than or equal to the lower limit vehicle speed, the deceleration target vehicle does not stop immediately after it enters (goes into) the straight road from the curved road, and stops after it travels for a predetermined distance (the first predetermined distance) after it enters the straight road. As a result, when the driver of the following vehicle finds/recognizes the deceleration target vehicle, the driver of the following vehicle can decelerate or stop the following vehicle without applying the sudden brake to the following vehicle.

Ninth Embodiment

Next, a vehicle running control apparatus according to the ninth embodiment of the present invention (hereinafter, may be referred to as a "ninth apparatus") will be described. The ninth apparatus calculates the curvature radius of the road on which the own vehicle is running based on road image data obtained by the camera apparatus 17b, and determines the lower limit vehicle speed based on the curvature radius.

Meanwhile, the radius of curvature of the road within a predetermined distance L and ahead of the own vehicle can be obtained in advance based on the road image data acquired by the camera apparatus 17b, wherein the road is a road on which the own vehicle will run/travel in the future. In view of the above, the ninth apparatus changes a running state of the own vehicle based on a speed in the future and the curvature radius of the road on which the own vehicle will run in the future.

Figure 19:
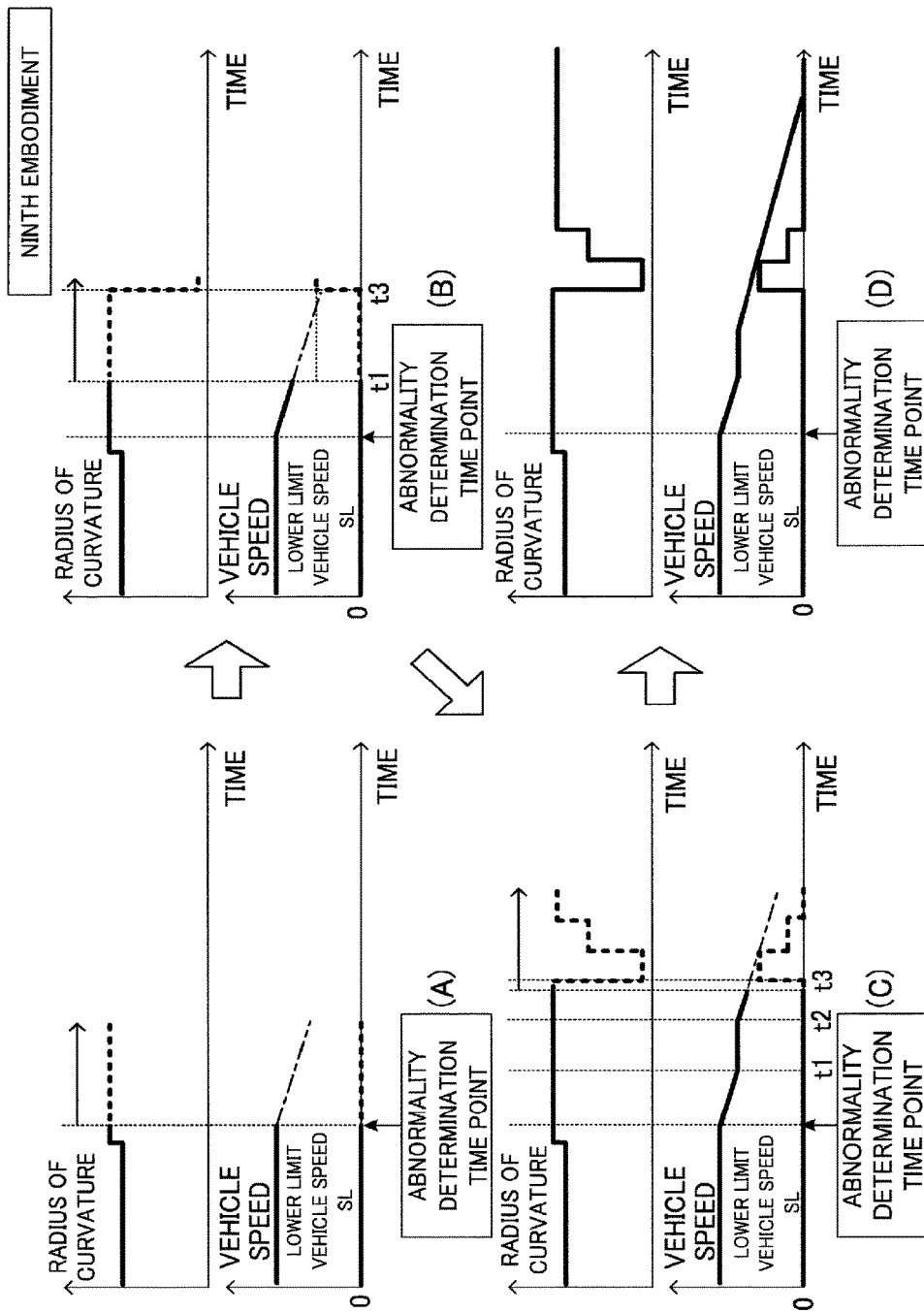
FIG. 19 is a timing chart for illustrating an operation of a vehicle running control apparatus (a ninth apparatus) according to a ninth embodiment of the present invention.
Figure 20:
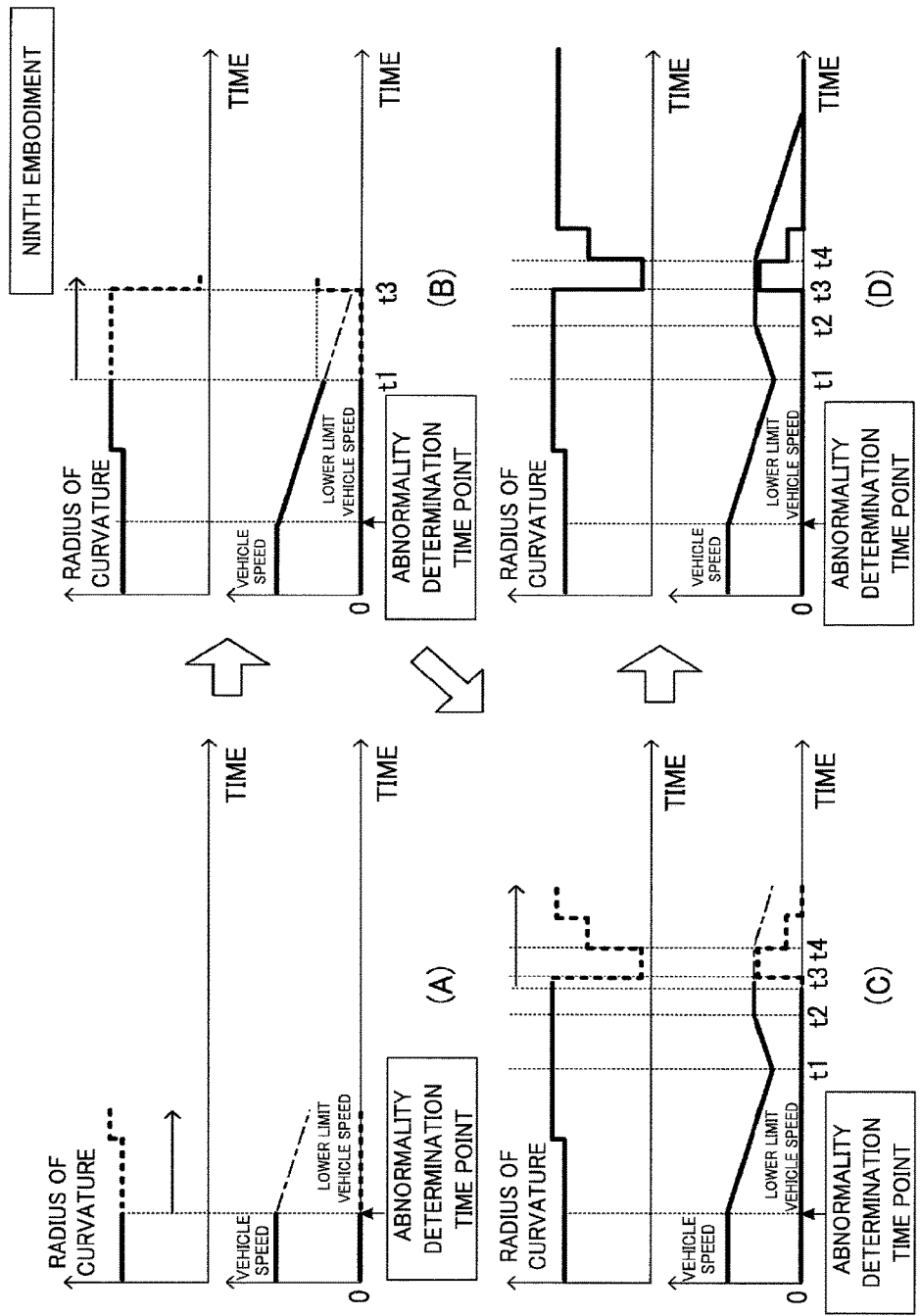
FIG. 20 is a timing chart for illustrating an operation of the ninth apparatus.

Hereinafter, distinctive features in the operation of the ninth apparatus is described based on examples shown in FIG. 19 and FIG. 20. In FIG. 19 and FIG. 20, solid lines indicate "the curvature radius, the vehicle speed, and the lower limit vehicle speed" up to the present time point, dashed lines indicate "the curvature radius and the lower limit vehicle speed of the road on which the own vehicle will run in the future" acquired using the camera apparatus 17b, and alternate long and short dash lines indicate the vehicle speed (predicted vehicle speed) of the own vehicle in the future.

Example 1

As shown by the dashed line in (A) of FIG. 19, when the curvature radius in the future which can be obtained at the abnormality determination time point is relatively large, the lower limit vehicle speed remains low. Therefore, when the own vehicle decelerates with/at a constant deceleration from the abnormality determination time point as shown by the alternate long and short dash line, the vehicle speed in the future does not become lower than the lower limit vehicle speed. Therefore, in this case, the ninth apparatus begins to decelerate the own vehicle with/at the constant deceleration from the abnormality determination time point.

Thereafter, as shown in (B) of FIG. 19, it is assumed that, when the present time arrives at the time t1, it is predicted that the curvature radius becomes small rapidly at a certain time t3 in the future, and thus, the lower limit vehicle speed becomes high rapidly. In this case, although the speed of the own vehicle at the time point t1 is higher than the lower limit vehicle speed at the time point t3, it is predicted that the vehicle speed of the own vehicle becomes lower than the lower limit vehicle speed at the time point t3 if the own vehicle continues to be decelerated with/at the constant deceleration. Therefore, as shown in (C) of FIG. 19, the ninth apparatus temporarily stops the deceleration at the time point t1 at which the above-described prediction is made so as to maintain the vehicle speed by making the own vehicle run with/at the constant speed.

Thereafter, when the ninth apparatus predicts that the vehicle speed will not become lower than the lower limit vehicle speed in the future even if the ninth apparatus decelerates the own vehicle with/at the constant deceleration (refer to the time point t2 in (C) of FIG. 19.), it begins to again decelerate the own vehicle with/at the constant deceleration. As a result, as shown in (D) of FIG. 19, the vehicle speed decreases without being smaller than the lower limit vehicle speed so as to reach "0".

Example 2

As shown by the dashed line in (A) of FIG. 20, when the curvature radius in the future which can be obtained at the abnormality determination time point is relatively large, the lower limit vehicle speed remains low. Therefore, when the own vehicle decelerates with/at the constant deceleration from the abnormality determination time point as shown by the alternate long and short dash line, the vehicle speed in the future does not become lower than the lower limit vehicle speed. Therefore, in this case, the ninth apparatus begins to decelerate the own vehicle with/at the constant deceleration from the abnormality determination time point.

Thereafter, as shown in (B) of FIG. 20, it is assumed that, when the present time arrives at the time t1, it is predicted that the curvature radius becomes small rapidly at a certain time t3 in the future, and thus, the lower limit vehicle speed becomes high rapidly. In this case, the speed of the own vehicle at the time point t1 has already become lower than the lower limit vehicle speed at the time point t3, and thus, it is predicted that the vehicle speed of the own vehicle naturally becomes lower than the lower limit vehicle speed at the time point t3 if the own vehicle continues to be decelerated with/at the constant deceleration. Therefore, as shown in (C) of FIG. 20, the ninth apparatus temporarily stops the deceleration at the time point t1 at which the above-described prediction is made and accelerates the own vehicle with/at a predetermined acceleration. The predetermined acceleration is an acceleration which is calculated in such a manner that the vehicle speed reaches a vehicle speed (a value obtained by adding a constant vehicle speed to the lower limit vehicle speed) higher than the lower limit vehicle speed determined based on the curvature radius at the point corresponding to the time point t3 before the own vehicle arrives at the point which has that curvature radius. Then, the ninth apparatus makes the own vehicle run/travel with/at a constant speed (refer to the time point t2), when and after the vehicle speed of the own vehicle reaches the lower limit vehicle speed at that point having the curvature radius corresponding to the time point t3.

Thereafter, when the ninth apparatus predicts that the vehicle speed will not become lower than the lower limit vehicle speed in the future even if the ninth apparatus decelerates the own vehicle with/at the constant deceleration (refer to the time point t4 in (C) and (D) of FIG. 20), it begins to again decelerate the own vehicle with/at the constant deceleration. As a result, as shown in (D) of FIG. 20, the vehicle speed decreases without being smaller than the lower limit vehicle speed so as to reach "0".

In this manner, the ninth apparatus can control the vehicle speed of the deceleration target vehicle so that the vehicle speed remains higher than or equal to the "lower limit vehicle speed determined in accordance with the radius of curvature" by changing the running state of the own vehicle based on the vehicle speed in the future and the curvature radius of the road on which the own vehicle will run in the future. Accordingly, since the deceleration target vehicle passes through the curved road at the vehicle speed higher than or equal to the lower limit vehicle speed, the deceleration target vehicle does not stop immediately after it enters (goes into) the straight road from the curved road, and stops after it travels for a predetermined distance (the first predetermined distance) after it enters the straight road. As a result, when the driver of the following vehicle finds/recognizes the deceleration target vehicle which has stopped, the driver of the following vehicle can decelerate or stop the following vehicle without applying the sudden brake to the following vehicle.

As described above, the vehicle running control apparatus according to each of the embodiments of the present invention can reduce the possibility that the sudden brake due to the "deceleration target vehicle which has stopped" is required for the following vehicle, because it does not stop the deceleration target vehicle in the stop prohibited area where the visibility is not good (the curved road and the section/region within the first predetermined distance from the point at which the road changes from the curved road to the straight road, the section within the second predetermined distance after passing the pass point).

The present invention is not limited to the above embodiments and modification examples, and various modification examples can be adopted within a scope of the present invention. For example, each of the above described apparatuses may adopt so-called "driver monitoring technique" disclosed in Japanese Patent Application Laid-Open (kokai) 2013-152700 etc., as the abnormality determination means for determining the abnormality of the driver (the process of determining whether or not the value of the driver abnormality occurrence flag Xijo should be set to "1"). More specifically, each of the above described apparatuses may finalize/confirm the determination that the driver is in the abnormal state of losing driving ability to set the value of the flag Xijo to "1", when it takes images of the driver using a camera fixed to a member (for example, a steering wheel, a pillar, or the like) in the vehicle interior, monitors the gaze direction (visual line) or the direction of the face of the driver using the images, and the gaze direction (visual line) or the direction of the face of the driver continues to be along the direction which is unusual during a normal driving of the vehicle for a predetermined period of time or more.

Further, each of the above described apparatuses may perform the abnormality determination of the driver using the confirmation button 90. More specifically, each of the apparatuses may finalize/confirm the determination that the driver is in the abnormal state of losing driving ability to set the value of the driver abnormality occurrence flag Xijo to "1", when the apparatus urges the driver to operate the confirmation button 90 using a displayed message and/or a voice message at every elapse of a first time, and a state in which the confirmation button 90 is not operated continues for a second time longer than the first time or more.

Further, the map database 22 may be provided in an external organization (traffic control center) of the vehicle, or the like. In this case, the vehicle running control apparatus according to each of the embodiments of the present invention may obtain the information (information including the curvature radius and the road gradient, information for specifying the stop prohibited area) on the shapes of the road using a communication device (not shown).

Furthermore, among the vehicle running control apparatuses according to the embodiments of the present invention, an apparatus which sets the lower limit vehicle speed by obtaining the information on the road shapes from the map database 22 may directly obtain the "lower limit vehicle speed corresponding to the road shape" which has been preset for each road section from the map database 22 in place of the information on the road shapes.

In addition, the vehicle running control apparatus according to each of the embodiment of the present invention may perform the abnormality determination of the driver, only when both of the traffic lane keeping control (Lane Keeping Assist control) and the trailing inter-vehicle gap control (Adaptive Cruise Control) are being performed by the operation of the operation switch 18 by the driver. It should be noted that the trailing inter-vehicle gap control is a control to make the own vehicle trail a preceding vehicle, while keeping the inter-vehicle gap between the preceding vehicle traveling right ahead the own vehicle and the own vehicle to be a predetermined distance, based on target information obtained by the radar sensor 17a and the camera device 17b. The Adaptive Cruise Control itself is well known (for example, refer to Japanese Patent Applications Laid-Open (kokai) 2014-148293 and 2006-315491, and Japanese Patents 4172434, and 4929777 and so on.) Therefore, the detail description is omitted.

An example of a method for the abnormality determination of a driver when both of the Lane Keeping Assist control and the Adaptive Cruise Control are being performed is as follows. For example, when a hands-off driving operation in which the steering torque Tra is zero ("0") continues for the first predetermined time (Tath: 5 seconds, for example), the vehicle running control apparatus makes the tentative (provisional) determination that there is a possibility that the driver may be in the abnormal state of losing driving ability so as to set the value of the tentative abnormality occurrence flag Xk to "1."

Further, the vehicle running control apparatus begins to decelerate the own vehicle with/at a very small deceleration from that state, and when a state in which neither the accelerator pedal operation amount AP nor the steering torque Tra changes continues for the second predetermined time (Tbth: for example, 30 seconds to 1 minute) even when the deceleration with/at the very small deceleration is being performed, the vehicle running control apparatus confirms/finalizes the determination that the driver is in the abnormal state of losing driving ability to set the value of the above mentioned driver abnormality occurrence flag Xijo to "1."

What is claimed is:

1. A vehicle running control apparatus applied to a vehicle comprising an electronic control unit configured to:
   determine whether or not a driver of said vehicle is in an abnormal state where said driver loses an ability to drive said vehicle; and
   decrease a vehicle speed of said vehicle to zero to stop said vehicle after an abnormality determination time point which is a time point at which it is determined that said driver is in said abnormal state,
   wherein,
   said electronic control unit is configured to:
   control said vehicle speed of said vehicle so as not to stop said vehicle within a stop prohibited area, wherein a curved road is defined as said stop prohibited area;
   decrease said vehicle speed of said vehicle toward a first vehicle speed greater than zero after said abnormality determination time point;
   perform a stop position prediction process for predicting a stop position of said vehicle in a case where said vehicle is decelerated with a constant deceleration from a state in which said vehicle speed is said first vehicle speed; and
   decrease said vehicle speed of said vehicle with said constant deceleration to zero, if said predicted stop position is not within said stop prohibited area.

2. The vehicle running control apparatus according to claim 1, wherein,
   said electronic control unit is configured to define a section between a first point at which a road changes from a curved road to a straight road and a second point to which said straight road extends for a first predetermined distance from said first point as said stop prohibited area.

3. The vehicle running control apparatus according to claim 2, wherein,
   said electronic control unit is configured to define a section between a pass point at which a gradient of a road changes from an ascending gradient to a descending gradient and a point that is a second predetermined distance away from said pass point as said stop prohibited area.

4. The vehicle running control apparatus according to claim 1, wherein,
   said electronic control unit is configured to:
   perform said stop position prediction process again after maintaining said vehicle speed of said vehicle at said first vehicle speed for a predetermined time, if said predicted stop position is within said stop prohibited area; and
   decrease said vehicle speed of said vehicle with said constant deceleration to stop said vehicle, if said predicted stop position is not within said stop prohibited area.

5. The vehicle running control apparatus according to claim 1, wherein,
   said electronic control unit is configured to:
   determine that said driver of said vehicle is in a tentative abnormal state when a first driving state which occurs when there is a possibility that said driver of said vehicle has lost said ability to drive said vehicle continues for a first threshold time or more; and
   determine that said driver of said vehicle is in said abnormal state when a second driving state which occurs when there is a possibility that said driver of said vehicle has lost said ability to drive said vehicle continues for a second threshold time or more from a time point at which it is determined that said driver is in said tentative abnormal state;
   decrease said vehicle speed of said vehicle toward said first vehicle speed with a first deceleration from a time point at which it is determined that said driver of said vehicle is in said tentative abnormal state;
   maintain said vehicle speed of said vehicle at said first vehicle speed when said vehicle speed of said vehicle reaches said first vehicle speed before a time point at which it is determined that said driver is in said abnormal state;
   perform said stop position prediction process for predicting said stop position of said vehicle in a case where said vehicle is decelerated with a constant second deceleration as said constant deceleration from said state in which said vehicle speed is said first vehicle speed after a time point at which it is determined that said driver is in said abnormal state;
   perform said stop position prediction process again after maintaining said vehicle speed of said vehicle at said first vehicle speed for a predetermined time, if said predicted stop position is within said stop prohibited area; and decrease said vehicle speed of said vehicle with said constant second deceleration to stop said vehicle, if said predicted stop position is not within said stop prohibited area.

6. The vehicle running control apparatus according to claim 2, wherein,
said electronic control unit is configured to set said first predetermined distance to a distance which becomes longer as a radius of curvature of said curved road connected to said first point becomes smaller.

7. The vehicle running control apparatus according to claim 2, wherein,
said electronic control unit is configured to control said vehicle speed of said vehicle in such a manner that said vehicle speed of said vehicle does not become lower than a lower limit vehicle speed which becomes higher as a radius of curvature of a curved road on which said vehicle runs becomes smaller, after said abnormality determination time point.

8. A vehicle running control apparatus applied to a vehicle comprising an electronic control unit configured to:
determine whether or not a driver of said vehicle is in an abnormal state where said driver loses an ability to drive said vehicle; and
decrease a vehicle speed of said vehicle to zero to stop said vehicle after an abnormality determination time point which is a time point at which it is determined that said driver is in said abnormal state,
wherein,
said electronic control unit is configured to:
determine that said driver of said vehicle is in a tentative abnormal state when a first driving state which occurs when there is a possibility that said driver of said vehicle has lost said ability to drive said vehicle continues for a first threshold time or more;
determine that said driver of said vehicle is in said abnormal state when a second driving state which occurs when there is a possibility that said driver of said vehicle has lost said ability to drive said vehicle continues for a second threshold time or more from a time point at which it is determined that said driver is in said tentative abnormal state;
control said vehicle speed of said vehicle so as not to stop said vehicle within a stop prohibited area, wherein a curved road is defined as said stop prohibited area;
decrease said vehicle speed of said vehicle toward a first vehicle speed with a first deceleration from a time point at which it is determined that said driver of said vehicle is in said tentative abnormal state;
maintain said vehicle speed of said vehicle at said first vehicle speed when said vehicle speed of said vehicle reaches said first vehicle speed before a time point at which it is determined that said driver is in said abnormal state;
perform a stop position prediction process for predicting a stop position of said vehicle in a case where said vehicle is decelerated with a constant second deceleration from a state in which said vehicle speed is said first vehicle speed after a time point at which it is determined that said driver is in said abnormal state;
perform said stop position prediction process again after maintaining said vehicle speed of said vehicle at said first vehicle speed for a predetermined time, if said predicted stop position is within said stop prohibited area; and
decrease said vehicle speed of said vehicle with said constant second deceleration to stop said vehicle, if said predicted stop position is not within said stop prohibited area.

9. A vehicle running control apparatus applied to a vehicle comprising an electronic control unit configured to:
determine whether or not a driver of said vehicle is in an abnormal state where said driver loses an ability to drive said vehicle; and
decrease a vehicle speed of said vehicle to zero to stop said vehicle after an abnormality determination time point which is a time point at which it is determined that said driver is in said abnormal state,
wherein,
said electronic control unit is configured to:
control said vehicle speed of said vehicle so as not to stop said vehicle within a stop prohibited area, wherein a curved road is defined as said stop prohibited area;
define a section between a first point at which a road changes from a curved road to a straight road and a second point to which said straight road extends for a first predetermined distance from said first point as said stop prohibited area; and
control said vehicle speed of said vehicle in such a manner that said vehicle speed of said vehicle does not become lower than a lower limit vehicle speed which becomes higher as a radius of curvature of a curved road on which said vehicle runs becomes smaller, after said abnormality determination time point.

* * * * *